(12) United States Patent
Fulkerson

(10) Patent No.: US 11,426,861 B2
(45) Date of Patent: Aug. 30, 2022

(54) SPECIAL COMPACT AND PORTABLE DOOR PULL FOR SANITARY USE

(71) Applicant: Sheryl A Fulkerson, Fishers, IN (US)

(72) Inventor: Sheryl A Fulkerson, Fishers, IN (US)

( * ) Notice: Subject to any disclaimer, the term of this patent is extended or adjusted under 35 U.S.C. 154(b) by 579 days.

(21) Appl. No.: 16/544,298

(22) Filed: Aug. 19, 2019

(65) Prior Publication Data

US 2020/0086477 A1 Mar. 19, 2020

Related U.S. Application Data

(60) Provisional application No. 62/723,842, filed on Aug. 28, 2018.

(51) Int. Cl.
*B25J 1/04* (2006.01)
*E05B 1/00* (2006.01)

(52) U.S. Cl.
CPC ............... *B25J 1/04* (2013.01); *E05B 1/0053* (2013.01); *E05B 1/0069* (2013.01)

(58) Field of Classification Search
CPC ........ E05B 1/0053; E05B 1/0069; B25J 1/04; B25B 9/02; A45F 5/102
USPC .......................................................... 294/26
See application file for complete search history.

(56) References Cited

U.S. PATENT DOCUMENTS

| 2,461,941 | A | * | 2/1949 | Sutton | A01K 97/14 403/111 |
|---|---|---|---|---|---|
| 2,536,535 | A | * | 1/1951 | Cederblad | A01K 97/14 294/26 |
| 2,725,253 | A | * | 11/1955 | Wallman | B66C 1/34 294/26 |
| 2,799,527 | A | * | 7/1957 | Cederblad | A01K 97/14 294/26 |
| 3,001,320 | A | * | 9/1961 | Sonner, Jr. | A01K 97/18 43/53.5 |
| 4,817,239 | A | | 4/1989 | Campbell | |
| 6,353,971 | B1 | | 3/2002 | Krawczyk | |
| 7,178,845 | B1 | * | 2/2007 | Metzger | E05B 1/0053 294/169 |
| 7,716,789 | B1 | | 5/2010 | Zevallos | |
| 7,854,040 | B1 | | 12/2010 | Ramos | |
| 8,720,116 | B1 | | 5/2014 | Ahmad | |
| 9,394,732 | B1 | | 7/2016 | Ahmad | |
| 10,036,415 | B2 | * | 7/2018 | Yitzhaki | F16B 45/00 |
| 2007/0241125 | A1 | | 10/2007 | Muderlak et al. | |
| 2007/0283490 | A1 | | 12/2007 | Wilt | |

(Continued)

*Primary Examiner* — Dean J Kramer
(74) *Attorney, Agent, or Firm* — Ritchison Law Offices, PC; John D Ritchison

(57) ABSTRACT

A compact and portable door pull for sanitary use that provides a method of opening a door so the user doesn't need to touch the door handle thus lessening the likelihood of any germ/bacteria transmission. The device consists of an outer case which is gripped and an extension/slide-out component, or pivoting extension component, both having a thumb bump to manually actuate the extension. Both extensions have a hook on the end which engages the door handle and allows the user to pull the door open without touching the handle. Once the device is disengaged from the door handle, the user retracts the extension by manually reversing the extension action using the thumb bump. The device can then be returned to its original storage location (i.e. pocket, purse, backpack or diaper bag) for future use.

16 Claims, 14 Drawing Sheets

(56) References Cited

U.S. PATENT DOCUMENTS

| | | |
|---|---|---|
| 2007/0289101 A1* | 12/2007 | Casteel ................ E05B 1/0053 16/422 |
| 2009/0145992 A1 | 6/2009 | Lavy |
| 2012/0074717 A1 | 3/2012 | Macfarlane |
| 2012/0131756 A1 | 5/2012 | Gilsenan et al. |
| 2012/0168047 A1 | 7/2012 | Wilson |
| 2012/0171269 A1 | 7/2012 | Kostak |
| 2013/0185897 A1 | 7/2013 | Bracey |
| 2014/0150211 A1 | 6/2014 | Bracey |
| 2016/0089774 A1 | 3/2016 | Cottam |

* cited by examiner

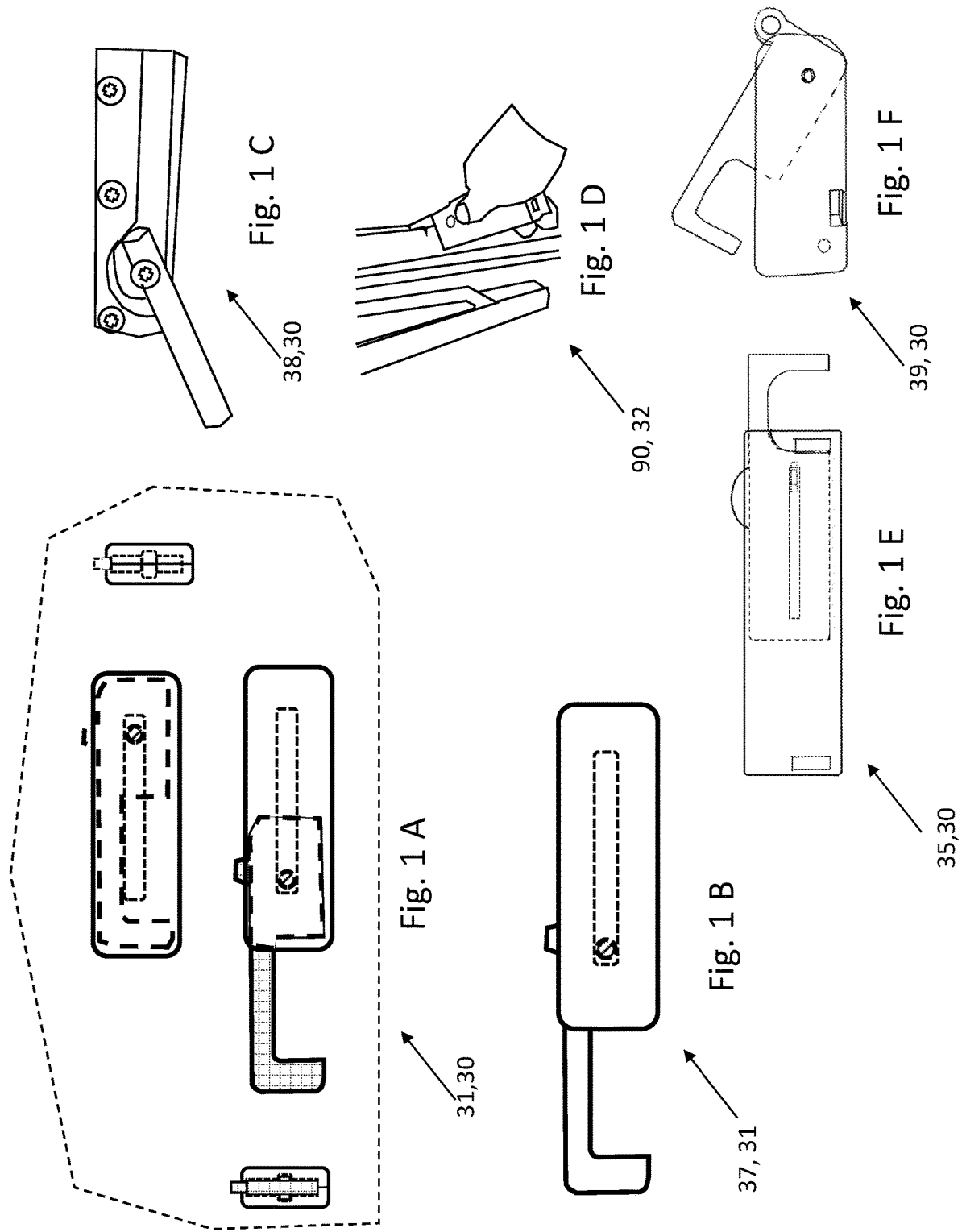

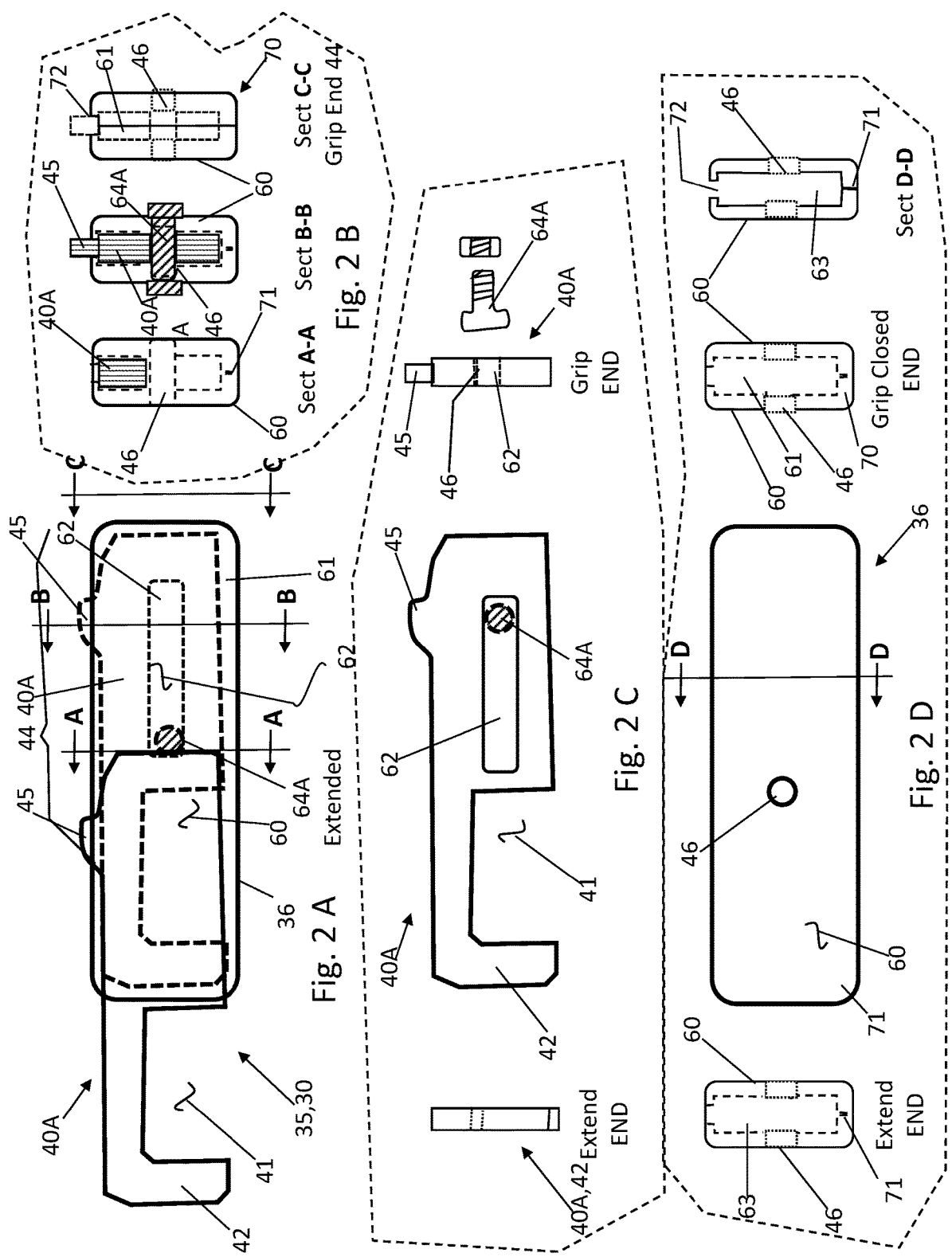

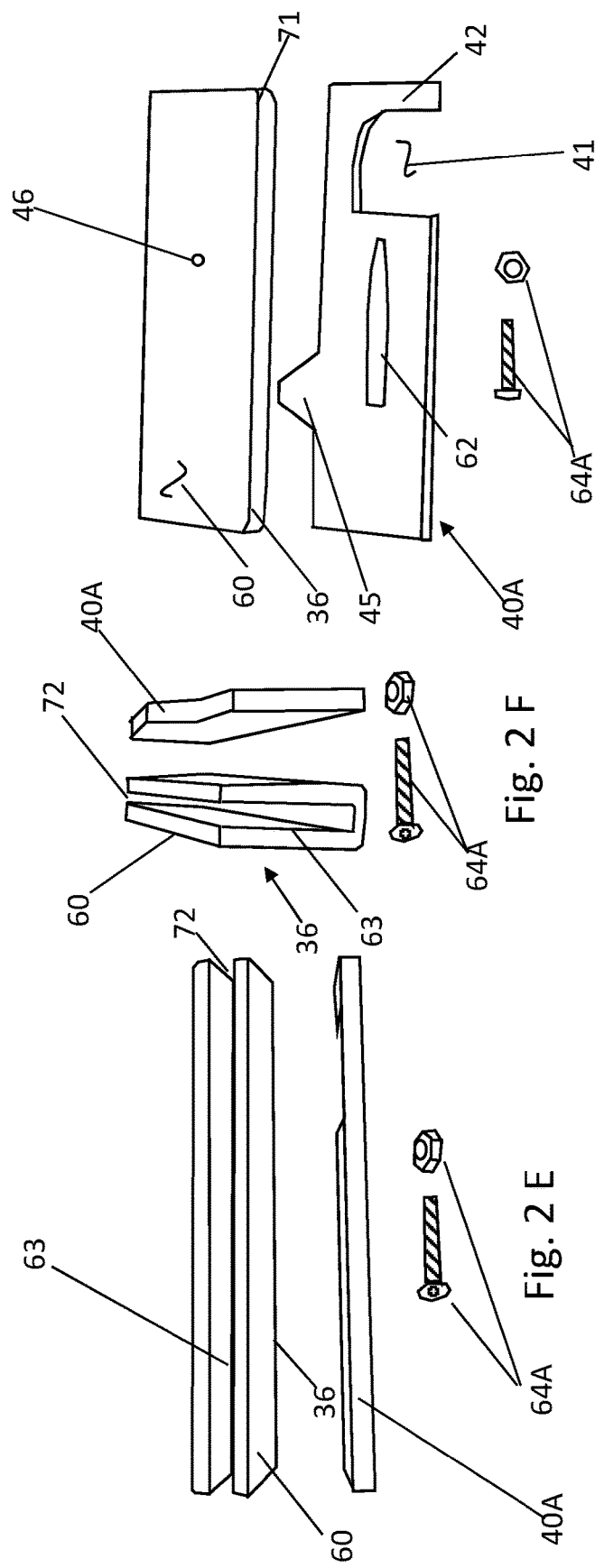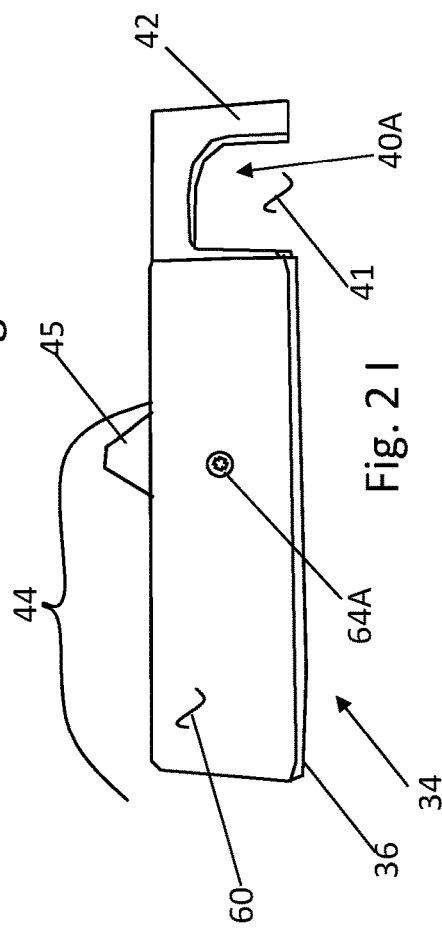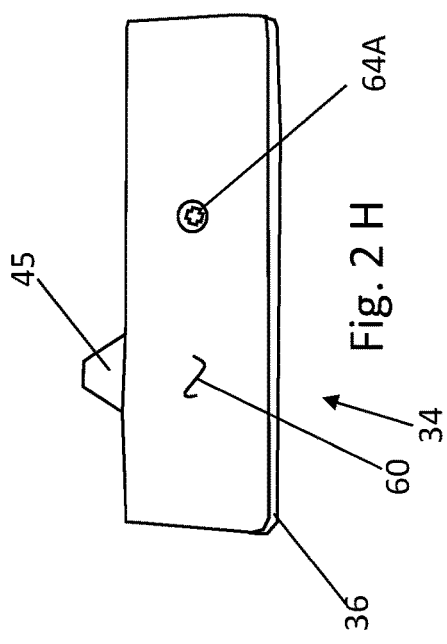

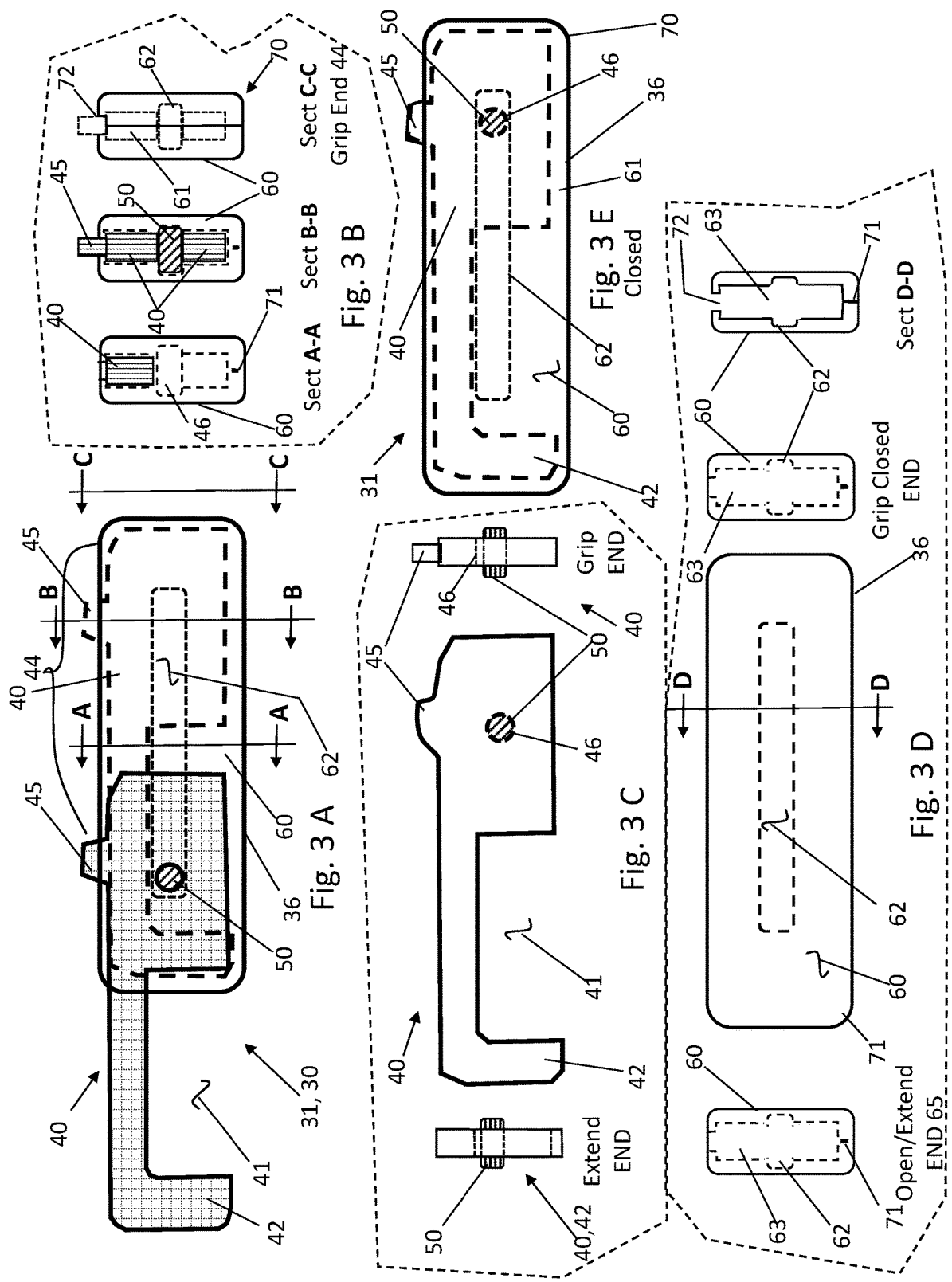

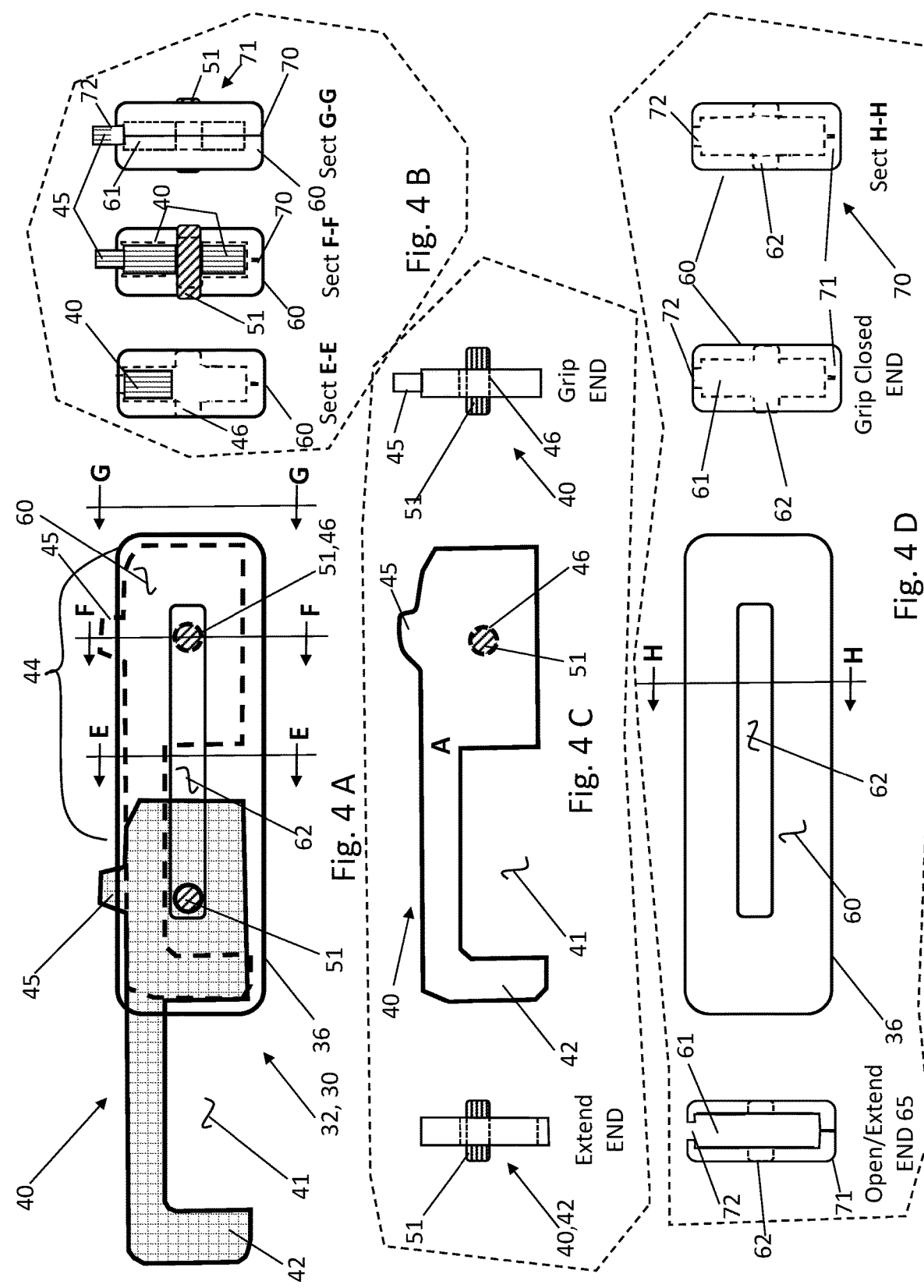

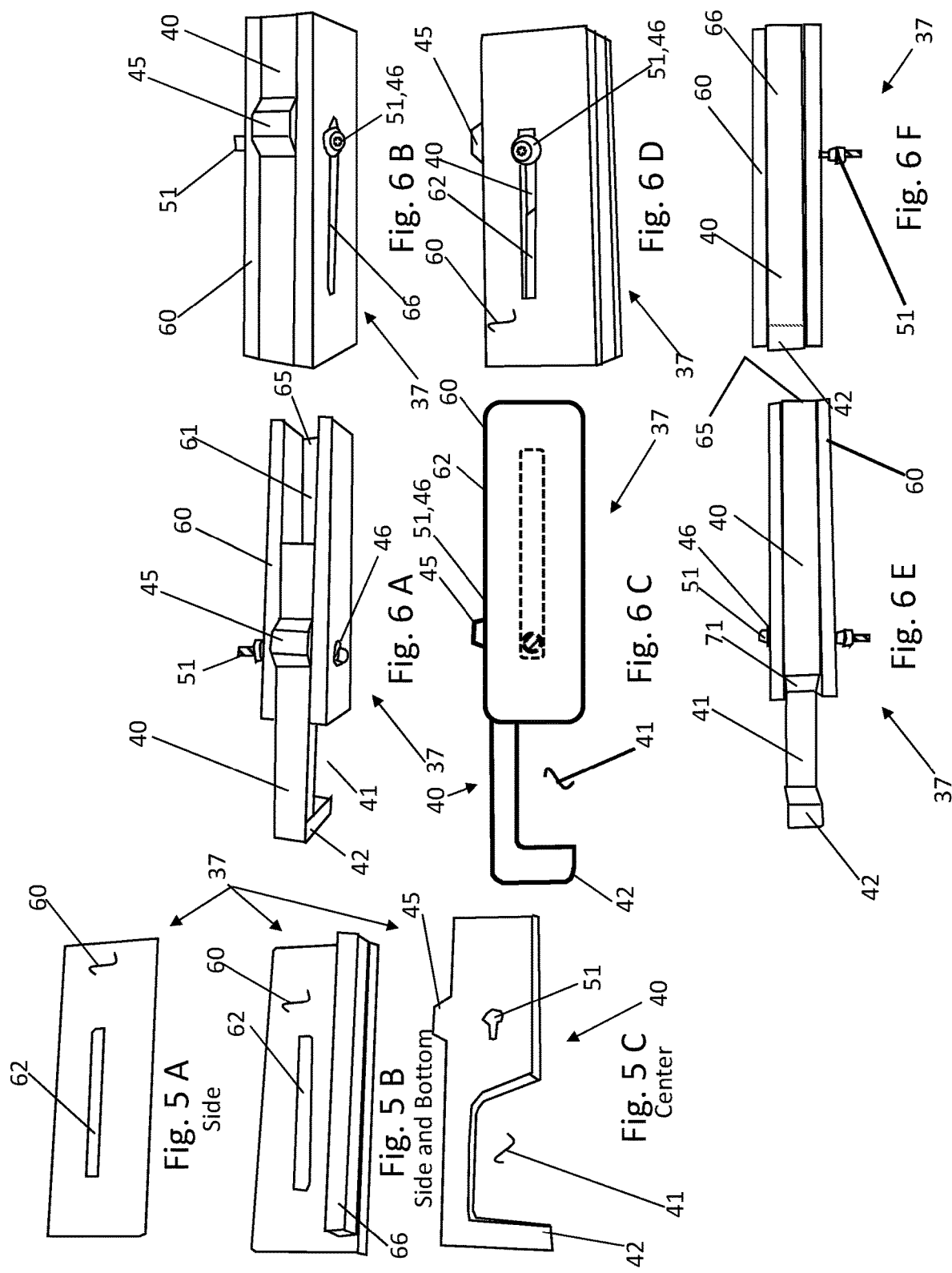

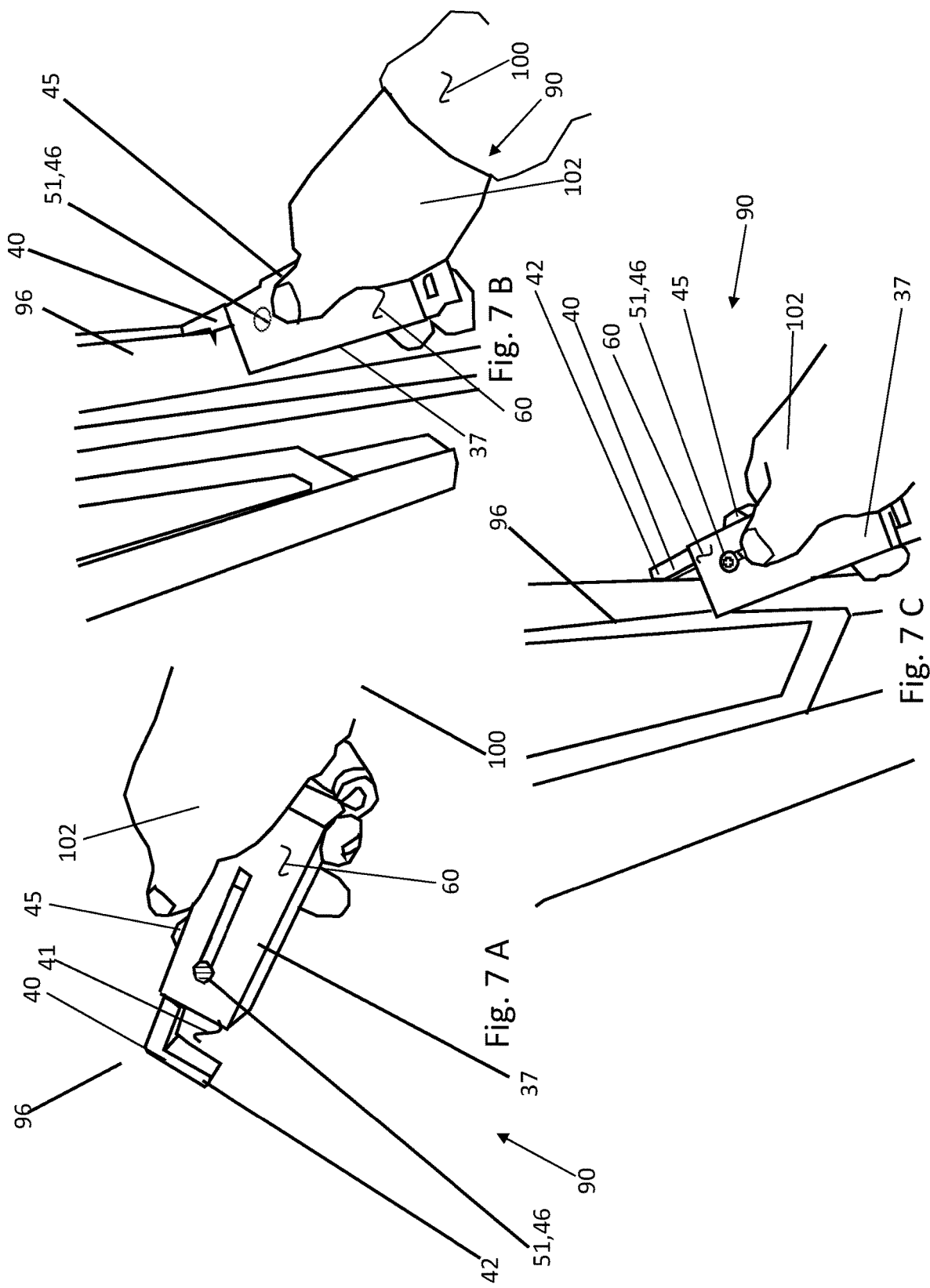

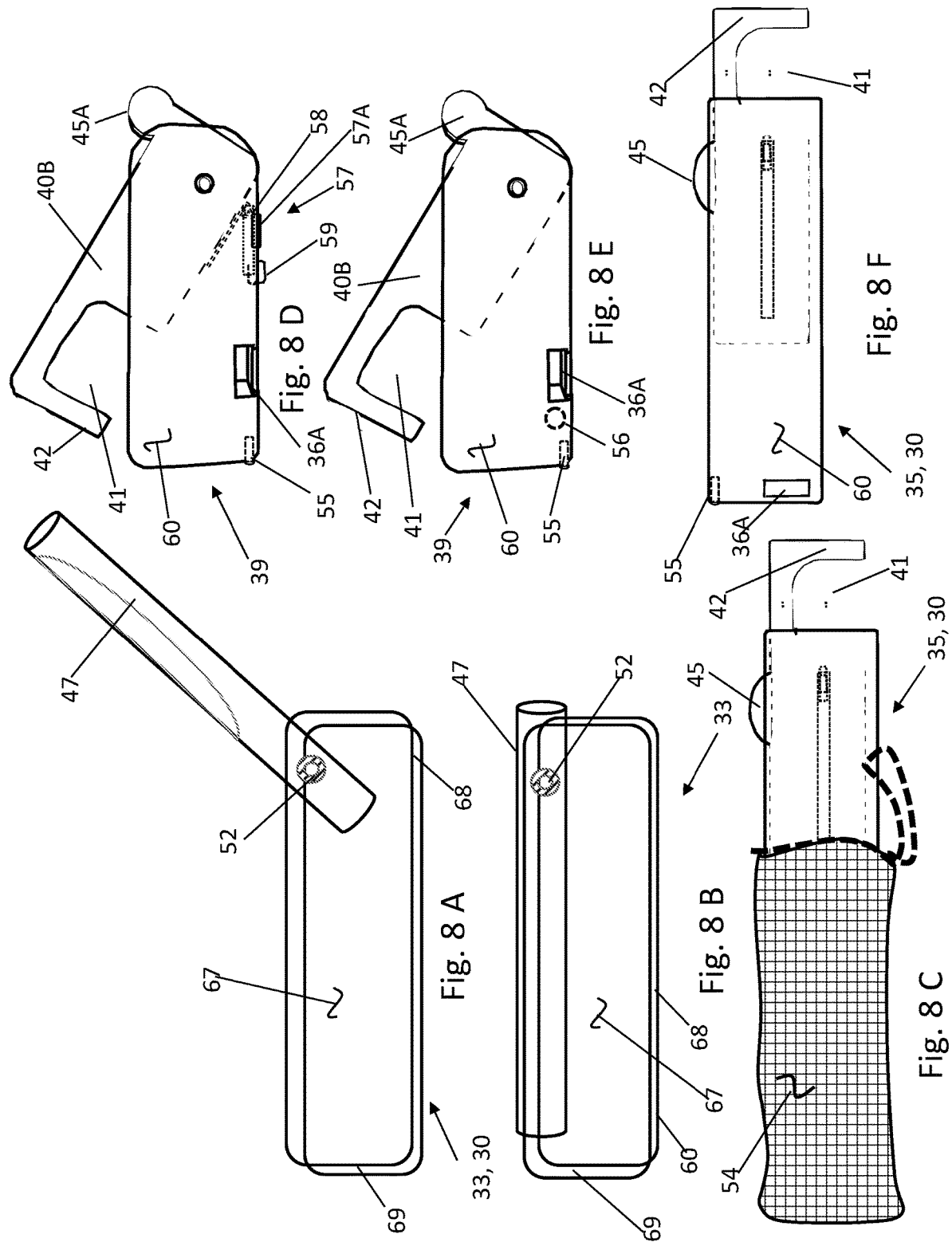

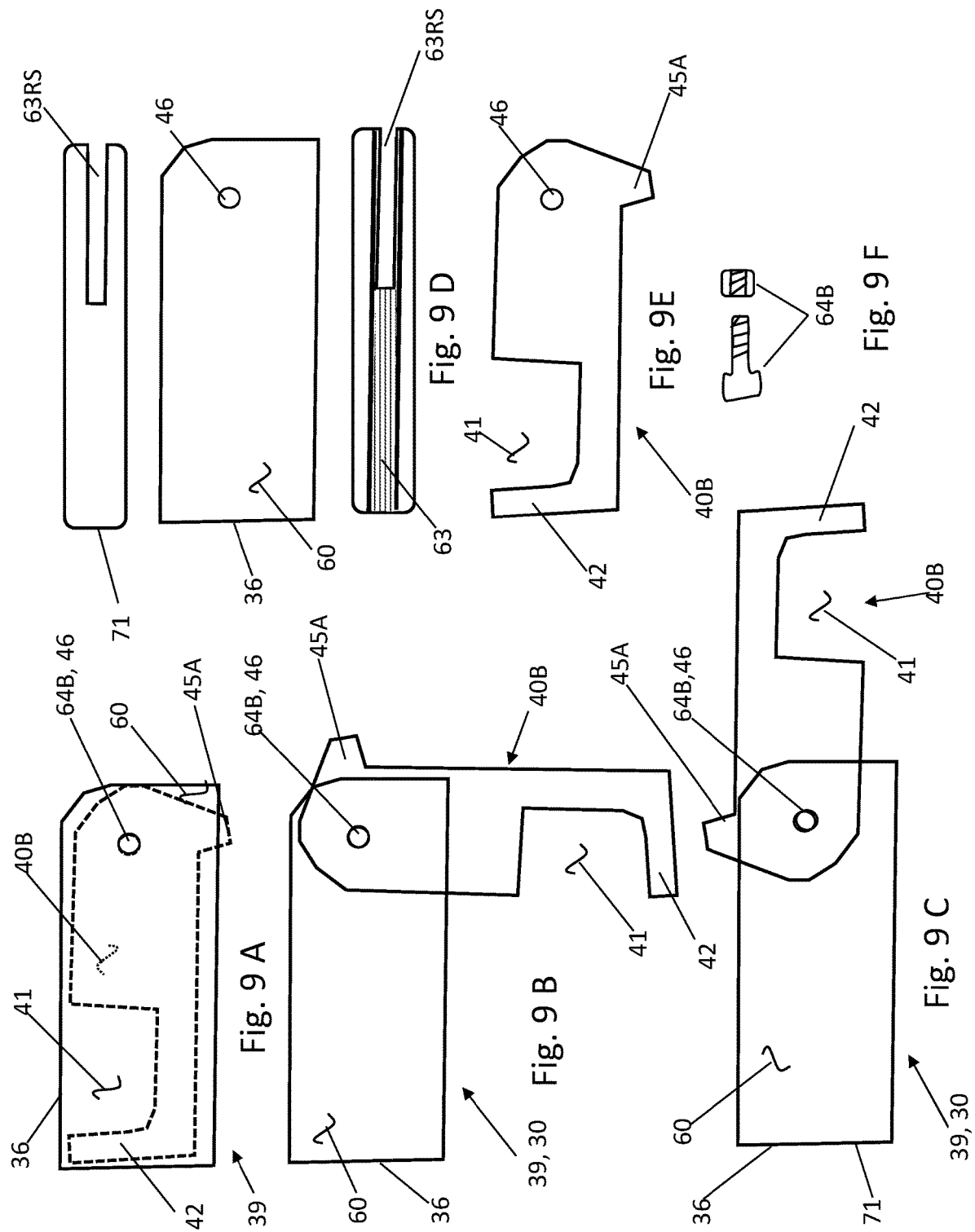

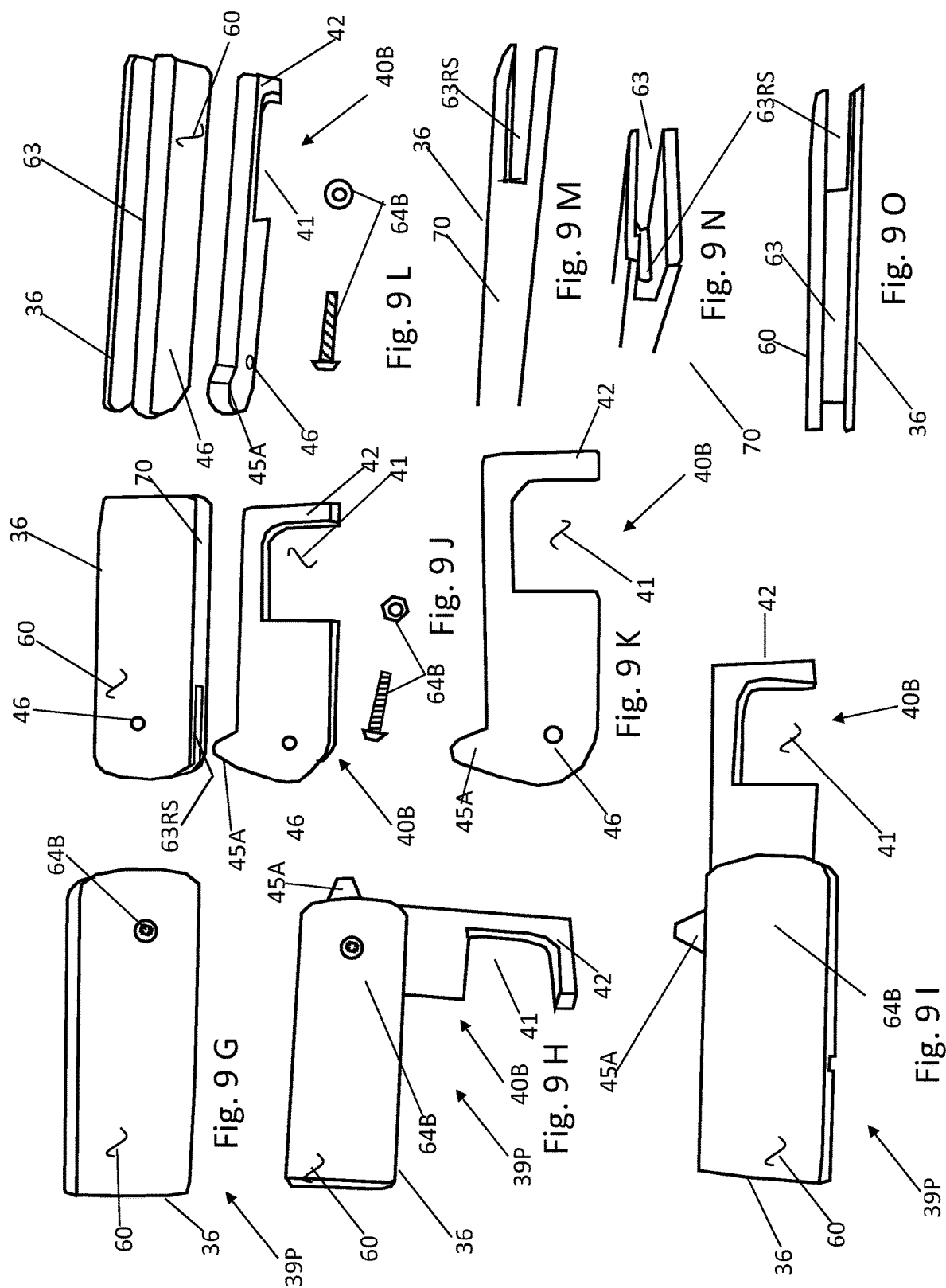

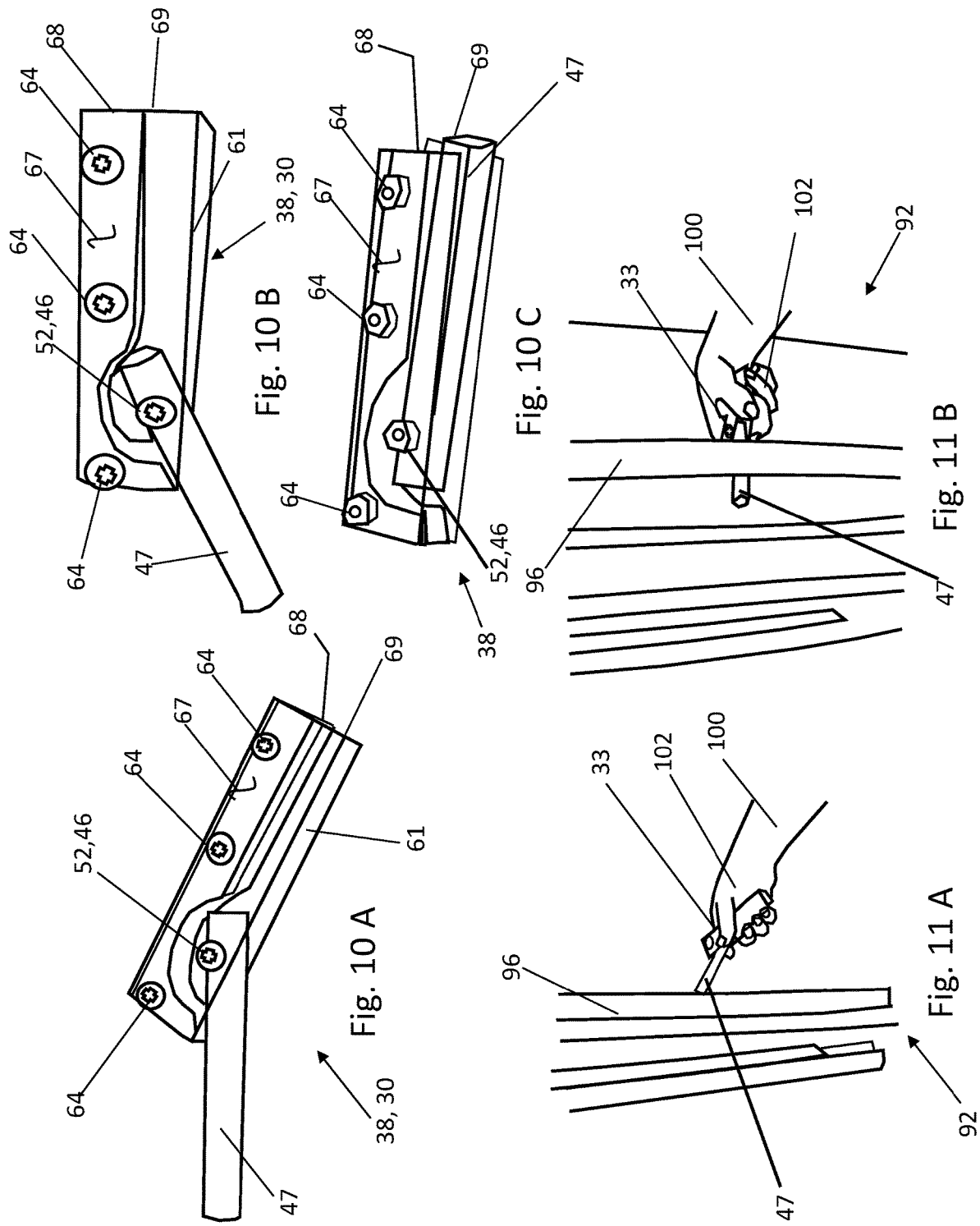

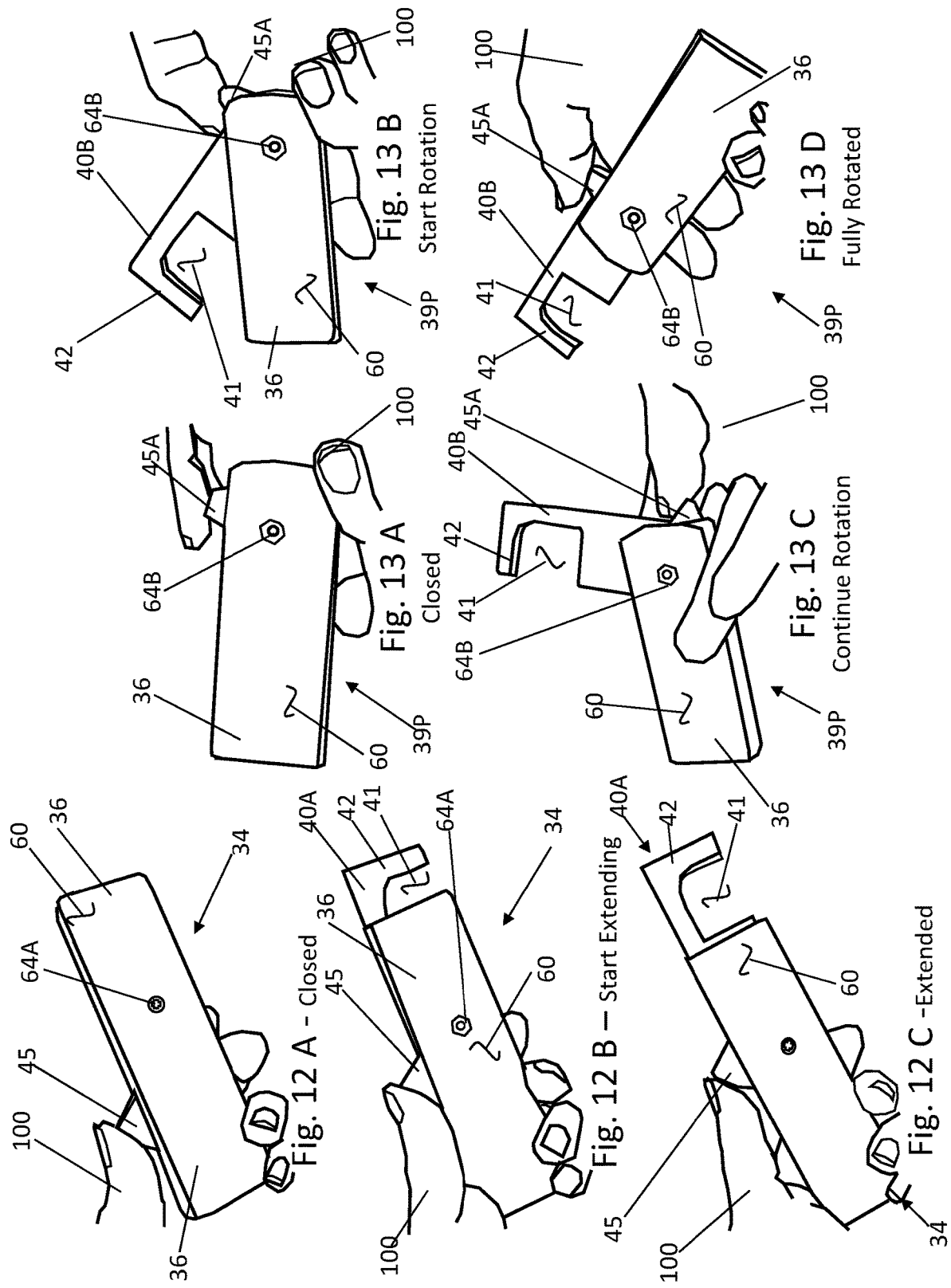

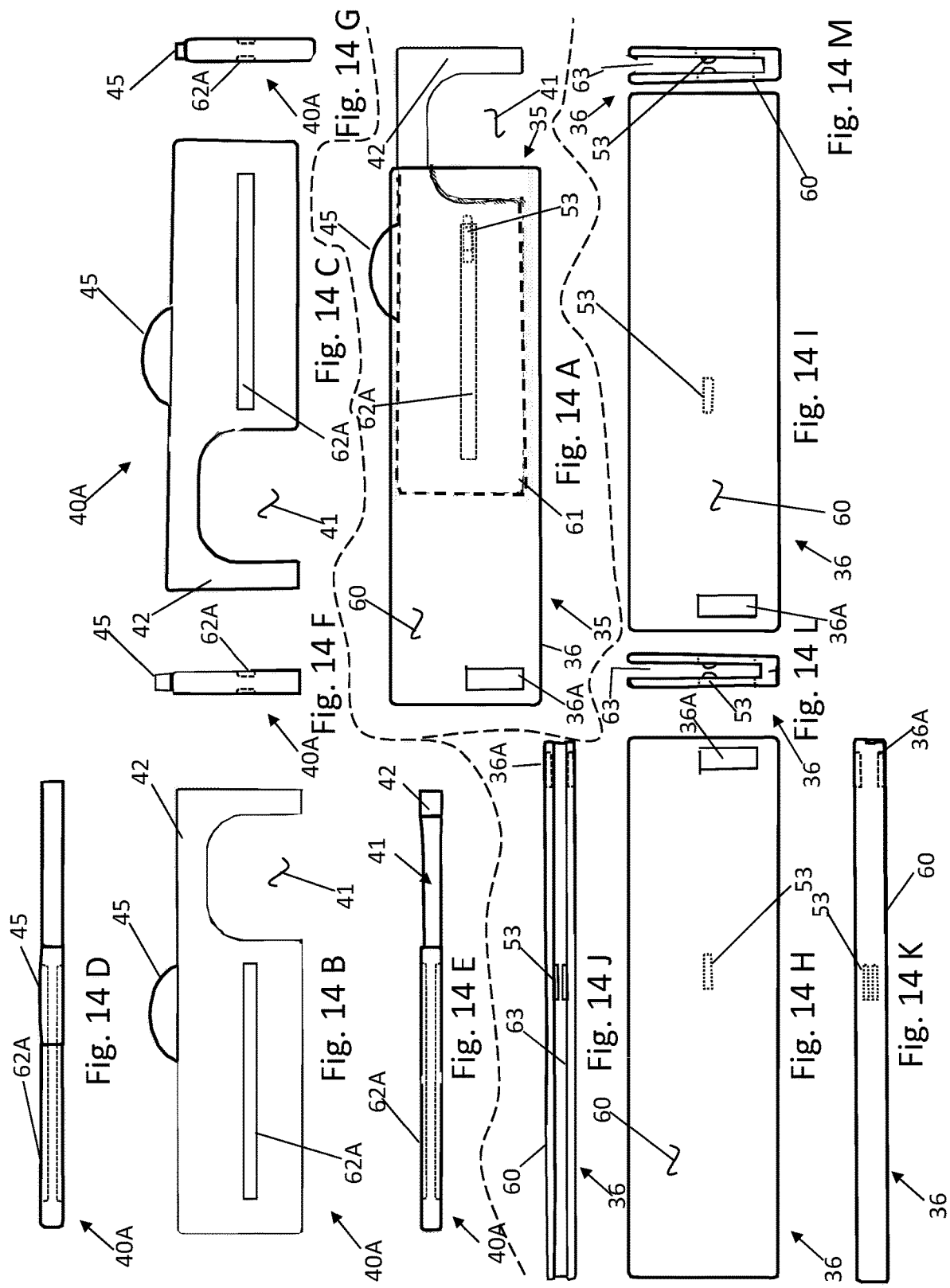

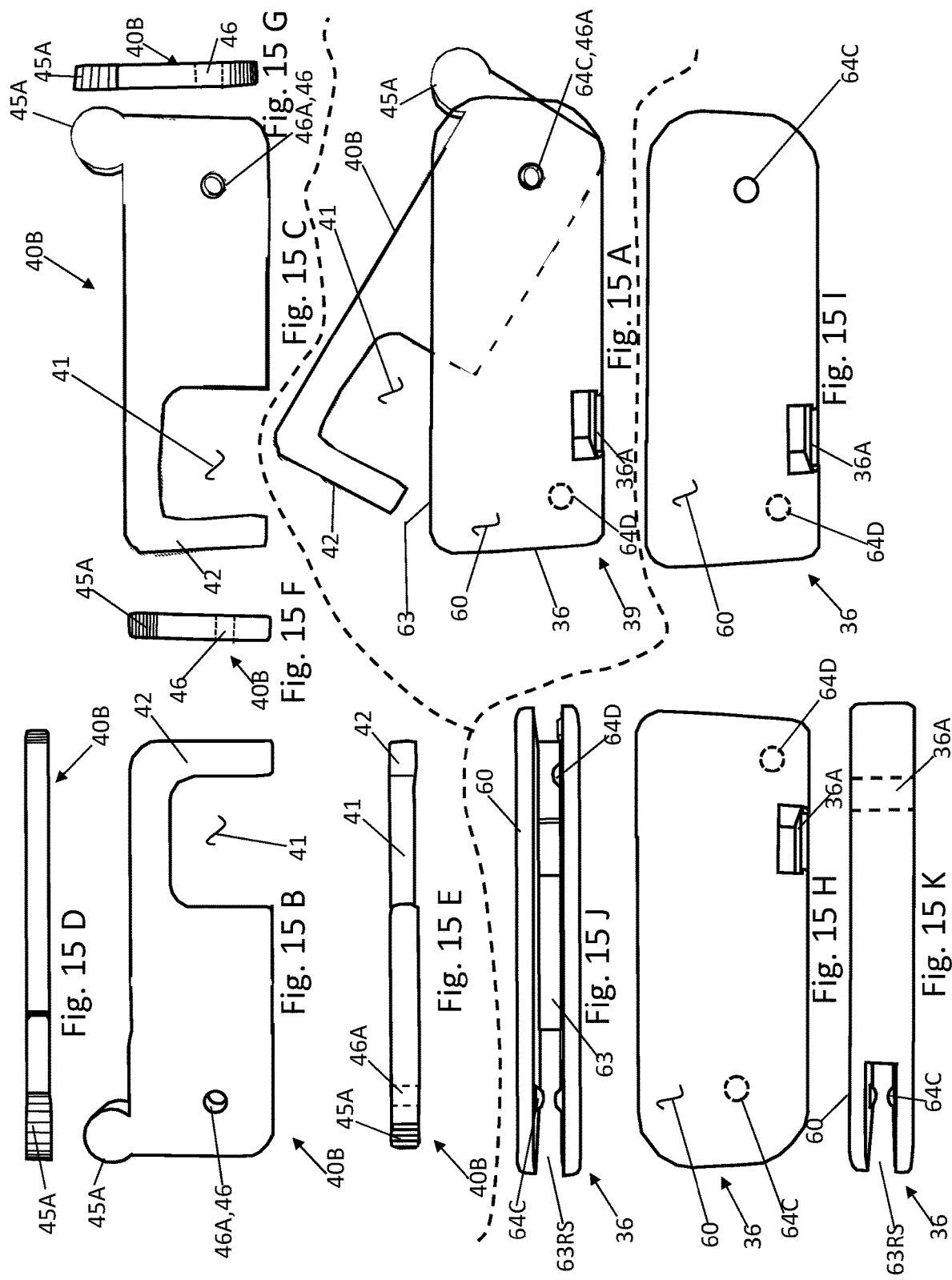

SPECIAL COMPACT AND PORTABLE DOOR PULL FOR SANITARY USE

CROSS-REFERENCE TO RELATED APPLICATIONS

This application claims the benefit of U.S. Provisional Patent Application with Ser. No. 62/723,842 filed Aug. 28, 2018, by Sheryl A. Fulkerson. The application is entitled "Special Compact and Portable Door Pull for Sanitary Use".

FIELD OF INVENTION

This invention relates to a special compact and portable door pull for sanitary use. The present invention is related to the configured hardware fitting associated with a door in order to reduce the incidence of germ transmission and the like. The device is directed toward an apparatus for sanitary exit of public restroom facilities and the like. In particular, the present invention provides a device for convenient, sanitary use of public restroom door handles during the opening of the exit door. This invention relates to sanitation in public restroom facilities, and specifically to improvements which enable users of such restroom facilities to avoid touching the restroom exit door after washing their hands.

FEDERALLY SPONSORED RESEARCH

None.

SEQUENCE LISTING OR PROGRAM

None.

BACKGROUND-FIELD OF INVENTION AND PRIOR ART

As far as known, there are no special compact and portable door pull for sanitary use or the like. It is believed that this product is unique in its design and technologies.

Background

This background as to sanitary opening of doors should be useful. Contaminated door handles have been a source of the transfer of bacteria, germs and potential diseases, especially in areas of high human traffic such as public restrooms, hospitals and restaurants to name a few. Most public restroom doors open inwards for safety reasons; therefore, the person entering the room does not necessarily have to touch any surface. However, the person exiting the room has to pull on a handle to open the door. A door, which can only open in one direction, cannot be opened without a handle; therefore, it becomes contaminated by the users and human-to-human transfer of germs and diseases is inevitable.

Using a manual door opener (e.g., handle, knob) with a bare hand can create health issues for the user. Hands often have germs on them, and those germs are easily transferred when a manual door opener is operated. Germs which are transferred by contact with a door opener do not generally infect the person exposed to them through the skin of the hand. Rather, the germs infect the person through his or her nose, eyes or mouth when the hand to which the germs have been transferred from the door opener comes into contact with one of the three. In general, the parts of the hand most likely to come into contact with the eyes, nose or mouth are the index finger and thumb and the parts of the hand closest to the index finger and thumb. Parts of the hand in regular contact with the eyes, nose and mouth, include index finger, especially the tip, knuckle and side adjacent to the thumb, the tip and back of the thumb, and the tip and knuckle of the middle finger. In addition, the tips of the fingers, especially those of the thumb and the first three fingers, frequently come into contact with each other and with the palm of the hand, thereby creating opportunities for germs picked up by one part of the hand to be transferred to another part of the hand and then to the nose, eyes or mouth.

Finger pulls cannot generally be used on a hinged door because the finger pull would have to be inset into an edge of the door by the frame in which the door is hung. Also, because applying a large force using only finger tips is uncomfortable or difficult for most people, finger pulls are generally used only on light sliding doors; for heavy sliding doors, handles are used.

A number of solutions have been developed and proposed to make door openers such as pulls, lever handles and knobs, more sanitary to operate. These solutions include door openers that are not operated using the hand, such as foot-operated pulls, forearm-operated pulls and automatic powered doors, disposable barriers such as paper or plastic sheets to prevent contact between skin of the hand and door opener, and antimicrobial devices, such as copper or silver coatings, alcohol sprayers and UV lighting, which kill germs that may adhere to the opener. None of these solutions has been widely implemented; in part, because door openers are very efficient to use and these solutions tend to make them less efficient; in part, because some of the solutions are too expensive; and in part, because some of the solutions are not completely effective (for example, copper or silver coatings don't kill all germs within a short enough timeframe).

No place is this more prevalent than public restroom facilities. By the nature of the facility, persons leaving the facility without thoroughly washing their hands potentially transport numerous germs and bacteria to the exit door handle. To compound the potential for spreading the same, persons leaving a public restroom facility are all touching the same spot, the door handle. This, of course, presents no problems if everyone practices proper hygiene; however, clearly everyone does not.

In order to combat this problem, many take an extra precaution when leaving the restroom. After drying their hands, they take an extra paper towel and use it as a barrier between their hand and the door handle when opening the door. However, in most restrooms, a waste basket is not conveniently placed near the exit, leaving the restroom patron to either take the paper towel with them or drop it at the entrance of the restroom. The latter, in turn, leads to a host of other sanitation problems. People, in fear of germs, will often use their shirt hem, or sleeve to avoid touching the door handle. Additionally, many restrooms now utilize automatic, hot-air hand dryers, leaving the sanitary patron no alternative, outside of taking their chances, that all those that previously accessed the door handle also practiced thorough hand washing techniques.

It would be useful to have a way of modifying door openers that could be widely implemented at low cost, and which could be implemented for a wide variety of door openers and other hand-operated devices.

Prior Art

Several designs for sanitary door handles, gloves and tissues for handling potentially contaminated door handles have been proposed over the years. Numerous innovations for sanitary covers have been provided in the prior art that will be described. Even though these innovations may be suitable for the specific individual purposes which they address, they differ significantly from the present invention. Other prior art was searched but as far as known, there is no other prior art that provides the uniqueness and advantages of the special compact and portable door pull for sanitary use as shown and described here. Prior art discovered includes:

A. A US Patent Application No. 20140150211 entitled a Door and Handle Sanitizers and Assemblies was applied for by Bracey in 2014. It demonstrates a flat or three-dimensional body constructed of a sanitary plastic, with an inner surface of the body defining a hollow interior adapted to contact a door hardware surface or projecting knob.

B. Another application by Bracey was US Patent Application No. 20130185897 entitled a Door Knob Sanitizer. Here was shown a three-dimensional shaped body constructed of a sanitary plastic, with an inner surface of the body defining a hollow interior which facilitates application over the door hardware and provides frictional engagement against a surface of the hardware.

C. Kostak applied for an anti-microbial articles for land vehicles, aircraft and marine craft, and method of manufacturing and using same under U S Patent Application No. 20120171269. This application concerns nano-particles such as nano-silver or nano-copper that are used for the construct of anti-microbial articles and accessories for vehicles, trains, and/or airplanes. The anti-microbial articles include a distal section, proximal section and a primary section. Advantageously, the antimicrobial article provides a sanitary environment that kills bacteria and retards bacteria growth.

D. US Patent Application No. 20120131756 named a Hygienic Door Handle System and Method was submitted by Gilsenan. It portrays a system and method for self-cleaning a door handle by utilizing the kinetic energy of opening a door. A cable, for example a multi-link chain, fixed to the door frame and a gear assembly is provided such that linear displacement of said cable is converted to potential energy in response to movement of said door.

E. US Patent Application No. 20120074717 called a Sanitary, minimum contact handle was applied for by Macfarlane. It demonstrates a door opener with a miniature handle sized for operating solely with a pinky minimizes the transfer of germs by reducing the area of the hand in contact with the door opener and limiting contact to a part of the hand less likely to transfer germs to the nose, eyes and mouth.

F. US Patent Application No. 20090145992 entitled a Sanitary Door Handle submitted by Meron Lavy relates to a flat sanitary door handle mechanism that incorporates a self-contained, mechanical, user-operated continuous material advancing system whereby the person touches a fresh length of material while using the flat door handle to open the door thus avoiding hand exposure to the surface of the flat handle which may have been contaminated by previous users.

G. Wilt submitted US Patent Application No. 20070283490 for a Door Handle Sanitation System. This is directed toward an apparatus for sanitary exiting of public restroom facilities. In particular, the present invention provides a device for convenient, sanitary use of public restroom door handles during opening the door while exiting.

H. US Patent Application No. 20070241125 called a Handle Cover Dispenser was provided by Muderlak. This is a device for dispensing and collecting handle or armature cover material or covers for use, by way of example, with door handles, knobs, and the like.

I. A U.S. Pat. No. 4,817,239 named a Door Hook was issued to Campbell issued in 1989. It provides a sanitary door opening assembly comprising a U-shaped bracket disposed around the outer edge and sides of a door. A hook is mounted to the U-shaped bracket and door by fasteners.

J. U.S. Pat. No. 6,353,971 is named a Touchless door pull apparatus and was issued to Krawczyk in 2002. It demonstrates a touchless door pull apparatus comprising an engagement slot on a door, and a cooperating hand tool. The slot and hand tool are cooperatively configured such that the hand tool can be engaged with an engagement surface associated with the slot, temporarily coupling the hand tool and the door to each other. The method preferably includes uncoupling and removing the hand tool from the door before door re-closure.

K. U.S. Pat. No. 7,716,789 entitled a Sanitary handle apparatus was issued in 2010 to Zevallos. It is a sanitary handle apparatus that provides a leveraged handle with a like-shaped rod within. The rod is partially exposed. A protective covering is fed onto the rod to prevent contact with germs and bacteria left by other individuals.

L. A U.S. Pat. No. 7,854,040 entitled a Portable germ barrier was issued to Ramos in 2010. It provides a portable, compact germ barrier for protecting a person from direct contact with an unsanitary surface, such as a doorknob, a toilet handle, or the like. A flexible fabric web is fixed to a plurality of stiffening rods that are each pivotally connected at a proximal end thereof to an actuating mechanism fixed through a central aperture of the web.

M. U.S. Pat. No. 8,720,116 called a Hands-free door opener assembly was issued to Ahmad in 2014. It is a hands-free door opener assembly that permits a person to open, close and lock a door by employing a forearm or elbow. The system comprises respective push handle members disposed on both the interior and exterior surfaces of the door.

N. U.S. Pat. No. 9,394,732 named a Hands-free door latch mechanism was issued to Ashmad in 2016. This shows a hands-free door latch mechanism that includes two mutually opposed actuator plates to each side of the door, with the plates disposed vertically and orthogonally to the plane of the door. The plates are rigidly connected, with the connector bar also rigidly connected to the latch of the door. When either plate is pushed toward the hinge line of the door, the connector draws the latch into the door to release the latch from the strike plate.

O. A US Patent Application No. 20120168047 named a Clamshell door handle grasper was submitted by Wilson in 2012. This demonstrates a firm bodied, clamshell-like device which is adapted to be easily opened to allow a user to conveniently grasp a door handle. Preferably, the clamshell has a hinge, or an easily repeatably foldable section, at or near its proximal end.

P. US Patent Application No. 20160089774 entitled a handheld engagement device was submitted by Cottam in 2016. It portrays a handheld engagement device comprising first and second planar flexible members interconnected at each end by hinge arrangements.

As can be observed, none of the prior art has anticipated or caused one skilled in the art of portable door pulls for sanitary use or similar devices to see this new invention by Fulkerson as obvious to a person skilled in the ordinary art of the sanitary pull industry. The special, compact, and portable door pull for sanitary use provides an answer to the need for a compact, simple sanitary pull that may be portable and easy to carry in a pocket or purse or attach to the exterior of a daypack, purse, back pack or diaper bag. It allows the ability to have available a simple and sanitary means to pull or grasp/hook a door handle out in a public setting or venue.

Problem Solved

The improvement and problem solved as to door opening devices should be a step forward in a sanitary device that is simple, compact and easy to use. In view of the limitations of products currently known in the art, a tremendous need exists for a convenient apparatus for sanitary access to the handle of a public restroom door. Applicant's invention, by its novel design, provides a solution in view of currently available devices. This solves the problem and need for a personal, foldable or retractable armature door opening assistance device which keeps patrons from grasping the unsanitary door handle thus cutting down on transmission of germs/bacteria from door handle to patron's hand. Device can be attached to exterior of purse, daypack, back pack or diaper bag or a belt loop or keychain.

SUMMARY OF THE INVENTION

This invention is a special compact and portable door pull for sanitary use. Taught here are the ways an out the front extension can be used to enable a person to open a door without physical contact between the hand of the person and a door handle. A preferred special compact and portable extender/slide out door pull device for sanitary use comprising: (a) a single piece case, the case comprising two case sides each side with an interior and exterior surface and a molded-in retention bump on the interior surface of each side to retain a center piece extension, and the case further comprising a connecting and closed bottom section; (b) the center piece extension having two external surfaces and comprising a closed slot/indentation running length wise on each external surface, a thumb bump, and a hook feature forming a partial perimeter around one half of a clearance area wherein the case surrounds the center piece extension which can be extended outwardly from one end of the case and can removably attach to a door handle by a person to enable the person to sanitarily pull the door handle and open a door without a hand of the person touching the door handle. An alternative special compact and portable flip-out/rotate-out door pull for sanitary use comprising: (a) a single piece case, the case comprising a rotation slot for internal clearance to allow for a rotation of a center door pull rotation member, and the case further comprising two case sides each side with an interior and exterior surface and, each side having a molded-in retention bump to engage an indentation as a means to secure the center pull rotation member to the case, and at least one case side on the interior having a molded-in bump stop to releasably stop/secure a hook of the center pull rotation member in a closed position; (b) the door pull rotation member comprising the rotatably/pivotally indentation to engage the molded-in bump of the case, a thumb bump, and a hook feature forming a partial perimeter around one half of a clearance area wherein the center pull rotation member is retained by the indentation and the molded-in bump of the case and the center pull rotation member placed between the interior of each case side and wherein the case encases the center pull rotation member whereby the member can be rotated and pivoted outwardly from one end of the case and the hook of the member can be removably attached to a door handle by a person to enable the person to sanitarily pull the door handle and open a door without a hand of the person touching the door handle. For both of the compact and portable extender/slide out door pull the compact and portable flip-out/rotate-out door pull, and their respective cases are made of a durable, resilient, and dishwasher-safe material.

OBJECTIVES AND ADVANTAGES

There are several objectives and advantages of the special compact and portable door pull for sanitary use. There are currently no known extendable, compact door pulls or the like that are effective at providing the objectives of this invention.

The special compact and portable door pull for sanitary use has various advantages and benefits:

| Item | Advantages and Benefits |
| --- | --- |
| 1 | Need for sanitary way to exit public restrooms. Some patrons will forgo washing hands after using restroom, then grab the door handle, thus transferring germs/bacteria to the door handle. |
| 2 | With more air hand dryers in use, there is less paper towel available to be used for holding onto door handle. |
| 3 | Patrons will wash hands, then not dry them with the air dryers or not dry them thoroughly. This leaves the door handle wet and allows for transmission of germs/bacteria to anyone who touches the door handle surface. |
| 4 | When paper towel is available, patrons will throw the used/soiled toweling on the floor near the exit, after using it to open the door with the door handle. |
| 5 | People, in fear of germs, will often use their shirt hem, or sleeve to avoid touching the door handle. |

Finally, other advantages and additional features of the present door pull device will be more apparent from the accompanying drawings and from the full description of the device. For one skilled in the art of sanitary devices and systems for opening doors, it is readily understood that the features shown in the examples with this product are readily adapted to other types of sanitary opening systems and devices.

DESCRIPTION OF THE DRAWINGS—FIGURES

The accompanying drawings, which are incorporated in and constitute a part of this specification, illustrate an embodiment of the special compact and portable door pull for sanitary use device that is preferred. The drawings together with the summary description given above and a detailed description given below serve to explain the principles of the door pull device. It is understood, however, that the special compact and portable door pull for sanitary use device is not limited to only the precise arrangements and instrumentalities shown.

FIG. 1A is a sketch of the special compact and portable door pull for sanitary use, FIG. 1B is a prototype of the alternate compact and portable door pull with a slide out extension, FIG. 1C is an alternative door pull with a rotating extension; FIG. 1D is a person using the special compact and portable door pull for sanitary use; FIG. 1E is a sketch of the preferred special compact and portable door pull for sanitary use; and FIG. 1F is a sketch of the alternative flip-out/rotate-out device special compact and portable door pull for sanitary use.

FIGS. 2A through 2D are sketches of an alternative special compact and portable extender/slide out door pull for sanitary use device with components and features noted.

FIGS. 2E through 2I are sketches of the prototype 34 of a special compact and portable extender/slide out door pull 35 for sanitary use device 30 with components and features noted.

FIGS. 3A through 3E are sketches of an alternative extender type of compact and portable door pull with the components and features shown from several views.

FIGS. 4A through 4D are sketches of an alternative extender type of compact and portable door pull with the components and features shown from several views.

FIGS. 5A through 5C are sketches of parts for the prototype slide out door pull for sanitary use with features of the door pull shown.

FIGS. 6A through 6F are full views of the prototype slide out door pull with features shown.

FIGS. 7A through 7C are sketches of a person using the alternative slide out door pull device for sanitary use.

FIGS. 8A through 8F are sketches of the sanitary door pull devices and other auxiliary features.

FIGS. 9A through 9F are sketches of the alternative special compact and portable flip out/rotate out door pull for sanitary use device.

FIGS. 9G through 9O are sketches of the prototype of the alternative special compact and portable flip out/rotate out door pull for sanitary use device.

FIGS. 10A through 10C are sketches of the prototype rotate out extension with a lever for the sanitary and portable door pull device.

FIGS. 11A and 11B are sketches of a prototype rotating extender with a lever and of a person using the alternative rotating extender with a lever for the sanitary door pull device.

FIGS. 12A through 12C are sketches of a person using the prototype 34 of the special compact and portable extender/slide out door pull 35 device for sanitary use.

FIGS. 13A through 13D are sketches of a person using the prototype 39P of the alternative special compact and portable flip out/rotate out door pull 39 device for sanitary use.

FIGS. 14A through 14M are sketches of a preferred special compact and portable extender/slide out door pull for sanitary use device.

FIGS. 15A through 15K are sketches of an alternative special compact and portable flip out/rotate out door pull for sanitary use device.

DESCRIPTION OF THE
DRAWINGS—REFERENCE NUMERALS

The following list refers to the drawings:

TABLE B

| Ref # | Description |
| --- | --- |
| 30 | special compact and portable door pull for sanitary use 30 |
| 31 | internal extension alternative design 31 of the compact and portable door pull for sanitary use 30 |

TABLE B-continued

| Ref # | Description |
| --- | --- |
| 32 | slotted extension design 32 of the compact and portable door pull for sanitary use 30 |
| 33 | pivot lever design 33 of the compact and portable door pull for sanitary use 30 |
| 34 | prototype 34 of a special compact and portable extender/slide out door pull 35 for sanitary use device |
| 35 | preferred special compact and portable extender/slide out door pull 35 for sanitary use device |
| 36 | case 36 |
| 36A | aperture/slot 36A for identification badge holder strap or key ring |
| 37 | extension prototype 37 of the slotted design 32 of the compact and portable door pull for sanitary use 30 |
| 38 | pivot lever design prototype 38 of the pivot lever design 33 of the compact and portable door pull for sanitary use 30 |
| 39 | alternative special compact and portable flip out/rotate-out door pull 39 for sanitary use device |
| 39P | prototype 39P of the alternative special compact and portable flip out/rotate out door pull 39 for sanitary use device |
| 40 | door pull extension 40 |
| 40A | center door pull extension 40A with indented closed slot 62A or retention channel 62 to guide retention fastener 64A or molded-in retention bump 53 for slide design 35 and prototype 34 |
| 40B | center pull rotation member 40B with through hole/aperture 46 to accept retention fastener 64B for rotate out/flip out design 39 and prototype 39P |
| 41 | clearance portion 41 of door pull extension 40, 40A, 40B |
| 42 | hook 42 of door pull extension 40, 40A, 40B |
| 44 | grip end of 44 door pull extension 40, 40A, 40B |
| 45 | thumb bump 45 of door pull extension 40, 40A |
| 45A | thumb bump 45A of door pull rotation member 40B |
| 46 | pin aperture 46 of door pull extension 34, 40, 40A, 40B for securing guide and retention pin 64A, 64B 50 |
| 46A | indentation/depression 46A on center pull 40B rotation member to engage a molded-in retention bump 64C |
| 47 | extension lever 47 for pivot/lever design 47 |
| 50 | guide and retention pin 50 for the internal extension design 31 of the door pull 30 |
| 51 | guide and retention pin 51 for the slotted extension design 32 of the door pull 30 |
| 52 | pivot pin 52 for pivot lever design 33 and its prototype 38 |
| 53 | molded-in retention bump 53 in the interior surface of case 36 as a means to slidably engage closed slot 62A of center door pull extension 40A |
| 54 | case, bag or sleeve 54 to contain and protect special compact and portable door pull for sanitary use 30, 35, 39 |
| 55 | small battery powered flashlight 55, with LED or equal |
| 56 | aperture 56 for key ring or lanyard |
| 57 | spring switch 57 with spring 58 and thumb latch 59 as a means to quickly open and rotate the center pull rotation member 40B in the case 36 of special compact and portable flip out/rotate out door pull 39 |
| 57A | a clip means 57A to connect the spring switch 57 to the case 36. |
| 58 | spring 58 for spring switch 57 |
| 59 | thumb latch 59 for spring switch 57 |
| 60 | case side 60 with an interior and exterior surface |
| 61 | case clearance 61 for extensions 40, 47 |
| 62 | open slot 62 for slotted design 32 and prototype 37 |
| 62A | closed slot/indent 62A in the center door pull extension 40A as a means to engage the molded-in retention bump 53 of the interior surfaces of case 36 |

TABLE B-continued

Reference numbers

| Ref # | Description |
|---|---|
| 63 | molded in retention channel or trough 63 for internal extension design 31 and preferred 35 |
| 63RS | rotation slot 63RS for internal clearance for the extension and rotatable design 38 and alternative rotatable 39 |
| 64 | retention fastener 64 for pivot lever design 38 |
| 64A | retention fastener 64A for slide design 35 and prototype 34 - such as threaded fastener, two piece rivet, pin and end keeper, or the like; materials metal, steel, aluminum, brass, steel alloy, plastics, and composite materials |
| 64B | retention fastener 64B for rotate out/flip out design 39 and prototype 39P - such as threaded fastener, two piece rivet, pin and end keeper, or the like; materials metal, steel, aluminum, brass, steel alloy, plastics, and composite materials |
| 64C | molded-in bump 64C to rotatably/pivotally engage indentation/depression 46A or aperture 46B as a means to rotatably secure center rotation member 40B to case 36 |
| 64D | molded-in bump stop 64D to stop/secure hook 42 of center pull rotation member 40B while in a closed position |
| 65 | open end 65 of prototype 37 |
| 66 | bottom 66 of prototype 37 |
| 67 | case side 67 for pivot lever design 33 and its prototype 38 |
| 68 | case bottom 68 for pivot lever design 33 and its prototype 38 |
| 69 | open end 69 of case for pivot lever design 33 and its prototype 38 |
| 70 | closed bottom at extend end 70 of internal extension design 31, of slotted design 32, of alternative special compact and portable flip out/rotate-out door pull 39, and of prototype 39P |
| 71 | closed end 71 at bottom of extend end of internal extension design 31 and of slotted design 32 |
| 72 | open end 72 at top of grip end of internal extension design 31 and of slotted design 32 |
| 90 | a person 90 using a slotted extension design 32 of the compact and portable door pull for sanitary use 30 |
| 92 | a person 92 using a pivot lever design 33 of the compact and portable door pull for sanitary use 30 |
| 96 | handle 96 of restroom door |
| 100 | person/operator 100 using a slotted extension design 34 of the compact and portable door pull for sanitary use 30 or using a portable/flip out door pull 39 to sanitarily open a door |
| 102 | hand 102 of the person 100 |

DETAILED DESCRIPTION OF PREFERRED AND ALTERNATIVE EMBODIMENTS

The present invention relates to a special compact and portable door pull for sanitary use. The present invention is related to the configured hardware fitting associated with a door in order to reduce the incidence of germ transmission and the like. The improved device is directed toward an apparatus for sanitary exit of public restroom facilities and the like. In particular, the present invention provides a device for convenient, sanitary use of public restroom door handles during the opening of the exit door. This invention relates to sanitation in public restroom facilities, and specifically to improvements which enable users of such restroom facilities to avoid touching the exit door handle in the restroom after washing their hands.

The advantages for the special compact and portable door pull for sanitary use 30 are listed above in the introduction. A preferred special compact and portable extender/slide out door pull 30, 35 device for sanitary use comprising: (a) a single piece case 36, the case 36 comprising two case sides 60 each side with an interior and exterior surface and a molded-in retention bump 53 on the interior surface of each side to retain a center piece extension 40A, and the case further comprising a connecting and closed bottom section 70; (b) the center piece extension 40A having two external surfaces and comprising a closed slot/indentation 62A running length wise on each external surface, a thumb bump 45, and a hook feature 42 forming a partial perimeter around one half of a clearance area 41 wherein the case 36 surrounds the center piece extension 40A which can be extended outwardly from one end of the case 36 and can removably attach to a door handle 96 by a person 100 to enable the person 100 to sanitarily pull the door handle 96. An alternative special compact and portable flip-out/rotate-out door pull 30,39 for sanitary use comprising: (a) a single piece case 36, the case 36 comprising a rotation slot 63RS for internal clearance to allow for a rotation of a center door pull rotation member 40B, and the case 36 further comprising two case sides 60 each side with an interior and exterior surface and each side having a molded-in retention bump 64C to engage an indentation 46A as a means to secure the center pull rotation member 40B to the case 36, and at least one case side on the interior having a molded-in bump stop 64D to releasably stop/secure a hook 42 of the center pull rotation member 40B in a closed position; (b) the door pull rotation member 40B comprising the rotatably/pivotally indentation 46A to engage the molded-in bump 64C of the case 36, a thumb bump 45A, and a hook feature 42 forming a partial perimeter around one half of a clearance area 41 wherein the center pull rotation member 40B is retained by the indentation 46A and the molded-in bump 64C of the case 36 and the center pull rotation member 40B placed between the interior of each case 36 side and wherein the case 36 encases the center pull rotation member 40B whereby the member 40B can be rotated and pivoted outwardly from one end of the case 36 and the hook 42 of the member 40B can be removably attached to a door handle 96 by a person 100 to enable the person 100 to sanitarily pull the door handle 96 and open a door without a hand 102 of the person 100 touching the door handle 96. For both of the compact and portable extender/slide out door pull 30,35 the compact and portable flip-out/rotate-out door pull 30,39, and their respective cases 36 are made of a durable, resilient, and dishwasher-safe material.

There is shown in FIGS. 1-15 a complete description and operative embodiment of the special compact and portable door pull for sanitary use device. In the drawings and illustrations, one notes well that the FIGS. 1-15 demonstrate the general configuration and use of this product. The various example uses are in the operation and use section.

The accompanying drawings, which are incorporated in and constitute a part of this specification, illustrate an embodiment of the special compact and portable door pull for sanitary use 30, 35 that is preferred. The drawings together with the summary description given above and a detailed description given below serve to explain the principles of the door pull device 30. It is understood; however, that the door pull device 30 is not limited to only the precise arrangements and instrumentalities shown. Other examples of door pulling sanitary and compact devices and uses are still understood by one skilled in the art of door pull devices to be within the scope and spirit shown here.

FIG. 1A is a sketch of the alternative special compact and portable door pull 31 for sanitary use, FIG. 1B is a prototype 37 of the alternative compact and portable door pull with a slide out extension, FIG. 1C is an alternative door pull 38 with a rotating extension lever; FIG. 1D is a person 90 using the special compact and portable door pull for sanitary use; FIG. 1E is a sketch of the preferred special compact and portable door pull for sanitary use; and FIG. 1F is a sketch of the alternative flip-out/rotate-out special compact and portable door pull for sanitary use.

FIGS. 2A through 2D are sketches of an alternative special compact and portable extender/slide out door pull 35 for sanitary use device 30 with components and features noted. These sketches show the closed and extended views for the device 30, 35. Components observed are: a special compact and portable extender/slide out door pull 35 for sanitary use device; a case 36; center door pull extension 40A with indented closed slot 62A or retention channel 62 to guide retention fastener 64A or retention bump 53 for slide design 35 and prototype 34; a clearance portion 41 of door pull extension 40A; a hook 42 of door pull extension 40A; a grip end 44 of door pull extension 40A; a thumb bump 45 of door pull extension 40A; a case side 60 with an interior and exterior surface; a case clearance 61 for extensions 40A; a retention channel or trough 63 for internal extension design 35; retention fastener 64A for slide design 35 and prototype 34—such as threaded fastener, two piece rivet, pin and end keeper, or the like; materials metal, steel, aluminum, brass, steel alloy, plastics, and composite materials; a closed bottom at extend end 71 of internal extension design 31 and of slotted design 32; a closed bottom at extend end 70 of internal extension design 31, of slotted design 32, of alternative special compact and portable flip out/rotate-out door pull 39, and of prototype 39P; and, an open end 72 at top of grip end of internal extension design 35.

FIGS. 2E through 2I are sketches of the prototype 34 of an alternative special compact and portable extender/slide out door pull 35 for sanitary use device 30 with components and features noted. In these views of the prototype 34, similar components and features are shown such as seen with the sketches of an alternative special compact and portable extender/slide out door pull 35 device. These include: the prototype 34 of the special compact and portable extender/slide out door pull 35 for sanitary use device; a case 36; a center door pull extension 40A with indented closed slot 62A or retention channel 62 to guide retention fastener 64A or molded-in retention bump 53 for slide design 35 and prototype 34; a clearance portion 41 of door pull extension 40A; a hook 42 of door pull extension 40A; a grip end 44 of door pull extension 40A; a thumb bump 45 of door pull extension 40A; a case side 60 with an interior and exterior surface; a case clearance 61 for extensions 40A; a molded-in retention channel or trough 63 for internal extension design 34; retention fastener 64A for slide design 35 and prototype 34—such as threaded fastener, two piece rivet, pin and end keeper, or the like; materials metal, steel, aluminum, brass, steel alloy, plastics, and composite materials; a closed bottom at extend end 71 of internal extension design 34; and, an open end 72 at top of grip end of internal extension design 34 device.

FIGS. 3A through 3E are sketches of an alternative extender type of compact and portable door pull internally sliding design 31 of the extension 40. Here the components and features are shown from several views. Viewed in these sketches are, similar to the previous paragraph: an internal extension design 31 of the compact and portable door pull for sanitary use 30; a case 36; a door pull extension 40; a clearance portion 41 of door pull extension 40; a hook 42 of door pull extension 40; a grip end of 44 door pull extension 40; a thumb bump 45 of door pull extension 40; a guide and retention pin 50 for the internal extension design 31 of the door pull 30; a case side 60 with an interior and exterior surface; a case clearance 61 for extensions 40; a molded-in retention channel or trough 63 for internal extension design 31; a closed bottom 70 at extend end 71 of internal extension design 31; a closed end 70 at bottom of extend end of internal extension design 31 and of slotted design 32; and, an open end 72 at top of grip end of internal extension design 31.

FIGS. 4A through 4D are sketches of an alternative extender type of compact and portable door pull design 32 with a slotted side 62. Again, the components and features are shown from several views. Demonstrated in these sketches are: a slotted extension design 32 of the compact and portable door pull for sanitary use 30; a case 36 with internal and external surfaces 60; a door pull extension 40; a clearance portion 41 of door pull extension 40; a hook 42 of door pull extension 40; a grip end of 44 door pull extension 40; a thumb bump 45 of door pull extension 40; a guide and retention pin 51 for the slotted extension design 32 of the door pull 30; an aperture or diameter 46 with snug or press fit into door pull extension 40, for slot pin 51 and pivot pin aperture 46; a case side 60 with an interior and exterior surface; a case clearance 61 for extensions 40; an open slot 62 for slotted design 32; an open end 65 of prototype 37; a closed bottom at extend end 71 of slotted design 32; a closed end 71 at bottom of extend end of slotted design 32; and, an open end 72 at top of grip end of slotted design 32.

FIGS. 5A through 5C are sketches of parts for the prototype 37 of the slide out door pull design 32 for sanitary use. The features and components of the door pull 37 show: a slotted extension design 32 of the compact and portable door pull for sanitary use 30; a door pull extension 40; a clearance portion 41 of door pull extension 40; a hook 42 of door pull extension 40; a thumb bump 45 of door pull extension 40; a guide and retention pin 51 for the slotted extension design 32 of the door pull 30; a case side 60 with an interior and exterior surface; an open slot 62 for slotted design 32 and prototype 37; and a bottom 66 of prototype 37.

FIGS. 6A through 6F are full views of the prototype 37 of the slide out door pull design 32 with features and components shown. Here are: an extension prototype 37 of the slotted design 32 of the compact and portable door pull for sanitary use 30; a door pull extension 40; a clearance portion 41 of door pull extension 40; a hook 42 of door pull extension 40; a thumb bump 45 of door pull extension 40; a guide and retention pin 51 for the slotted extension design 32 of the door pull 30; an aperture or diameter 46, with snug or press fit into door pull extension slot pin 51; a case side 60 with an interior and exterior surface; a case clearance 61 for extensions 40; an open slot 62 for slotted design 32 and prototype 37; an open end 65 of slotted prototype 37; a bottom 66 of slotted prototype 37; and, an open bottom at extend end 71 of internal extension design 31 and of slotted design 32.

FIGS. 7A through 7C are sketches of a person 90 using the slide out door pull device 30 for sanitary use. It is described below in the operation section.

FIGS. 8A through 8F are sketches of the sanitary door pull devices 33, 35, 39 and other auxiliary features. The figures shown portray the following components and features: a pivot lever design 33 of the compact and portable door pull for sanitary use 30; a preferred special compact and portable extender/slide out door pull 35 for sanitary use device; an alternative special compact and portable flip out/rotate out door pull 39 for sanitary use device; thumb bump 45 of door pull extension member 40, 40A; thumb bump 45A of door pull rotation member 40B; an extension lever 47 for pivot design 33; a pivot pin 52 for pivot lever design 33 and its prototype 38; a case, bag or sleeve 54 to contain and protect special compact and portable door pull for sanitary use 30, 35, 39; a small battery powered flashlight 55, with LED or equal; an aperture 56 for key ring or lanyard; a spring switch 57 with spring 58, a clip means 57A to connect the spring switch 57 to the case 36, and thumb latch 59 as a means to quickly open and rotate the center pull rotation member 40B in the case 36; alternative special compact and portable flip out/rotate out door pull 39 for sanitary use device; a spring 58 for spring switch 57; a thumb latch 59 for spring switch 57; a case side 67 for pivot lever design 33 and its prototype 38; and a case bottom 68 for pivot lever design 33 and prototype 38.

FIGS. 9A through 9F are sketches of the alternative special compact and portable flip out/rotate out door pull 39 for sanitary use device. Components and features that are shown and portrayed by these sketches are: an alternative special compact and portable flip out/rotate out door pull 39 for sanitary use device; a case 36; center pull rotation member 40B with through hole/aperture 46 to accept retention fastener 64B for rotate out/flip out design 39 and prototype 39P; a hook 42 of door pull rotation member 40B; a thumb bump 45A of door pull rotation member 40B; a case side 60 with an interior and exterior surface; a retention channel or trough 63 for internal extension design 39; a rotation slot 63RS for internal clearance of the center rotation member 40B as it is rotated into position; retention fastener 64B for rotate out/flip out design 39 and prototype 39P—such as threaded fastener, two piece rivet, pin and end keeper, or the like; materials metal, steel, aluminum, brass, steel alloy, plastics, and composite materials; a closed bottom 71; and a closed end 70.

FIGS. 9G through 9O are sketches of the prototype 39P of the alternative special compact and portable flip out/rotate out door pull device 39 for sanitary use. Again shown here are a prototype 39P of an alternative special compact and portable flip out/rotate out door pull 39 for sanitary use device; a case 36; center pull rotation member 40B with through hole/aperture 46 to accept retention fastener 64B for rotate out/flip out design 39 and prototype 39P; a hook 42 of door pull rotation member 40B; a thumb bump 45A of door pull rotation member 40B; a case side 60 with an interior and exterior surface; a molded-in retention channel or trough 63 for flip out design 39; a rotation slot 63RS for internal clearance of the center rotation member 40B as it is rotated into position; retention fastener 64B for rotate out/flip out design 39 and prototype 39P—such as threaded fastener, two piece rivet, pin and end keeper, or the like; materials metal, steel, aluminum, brass, steel alloy, plastics, and composite materials; and a closed bottom 70.

FIGS. 10A through 10C are sketches of the prototype rotate out extension for the sanitary door pull device. Here the components shown are: an extension prototype 38 of the pivot lever design 33 of the compact and portable door pull for sanitary use 30; an extension lever 47 for pivot design 33; a pivot pin 52 for pivot lever design 33 and prototype 38; an aperture or diameter 46, with snug or press fit into the pivot extension lever 47, for pivot pin aperture 46; a case clearance 61 for extension lever 47; a retention fastener 64 for pivot design 33 and pivot lever design 38; a case side 67 for pivot lever design 33 and its prototype 38; a case bottom 68 for pivot lever design 33 and its prototype 38; and, an open end 69 of case for pivot lever design 33 and its prototype 38.

FIGS. 11A and 11B are sketches of a prototype rotating lever design 33 and of a person 100 using the alternative rotating extender for the sanitary door pull device. FIGS. 12A through 12C are sketches of a person using the prototype 34 of the special compact and portable extender/slide out door pull device 35 for sanitary use. FIGS. 13A through 13D are sketches of a person using the prototype 39P of the alternative special compact and portable flip out/rotate out door pull device 39 for sanitary use. These uses for the FIGS. 11-13 are described below in the operation section paragraphs.

FIGS. 14A through 14M are sketches of a preferred special compact and portable extender/slide out door pull 35 for sanitary use device. In these figures are demonstrated: a preferred special compact and portable extender/slide out door pull 35 for sanitary use device; a case 36; an aperture/slot 36A for identification badge holder strap or key ring; a center door pull extension 40A with indented closed slot 62A or retention channel 62 to guide molded-in retention bump 53 (or alternatively a fastener 64A) for slide design 35 and prototype 34; a clearance portion 41 of door pull extension 40, 40A; a hook 42 of door pull extension 40, 40A; a thumb bump 45 of door pull extension 40, 40A; a case side 60 with an interior and exterior surface; a case clearance 61 for extensions 40,40A; a closed slot/indent 62A in the center door pull extension 40A as a means to engage the molded-in retention bump 53 on the internal surfaces of case 36; and a molded-in retention channel or trough 63 for internal extension design 31 and preferred 35. In FIG. 14A the combination of the case 36 and a center door pull extension 40A with closed slot/indent 62A form the preferred special compact and portable extender/slide out door pull 35 for sanitary use device. How it operates is described below in the operation section.

FIGS. 15A through 15K are sketches of an alternative special compact and portable flip out/rotate out door pull 39 for sanitary use device. Components and features shown here include: an alternative special compact and portable flip out/rotate out door pull 39 for sanitary use device; a center pull rotation member 40B with through hole/aperture 46 or indentation/depression 46A on center pull 40B rotation member to accept retention fastener 64B for rotate out/flip out design 39 and prototype 39P; a case 36; an aperture/slot 36A for identification badge holder strap or key ring; a clearance portion 41 of door pull rotation member 40B; a hook 42 of door pull rotation member 40B; a thumb bump 45A of door pull rotation member 40B; an indentation/depression 46A on center pull rotation member 40B; a case side 60 with interior and exterior surfaces; a rotation slot 63RS for internal clearance for the rotation design 39, and rotatable 39; a molded-in bump 64C to rotatably/pivotally engage indentation/depression 46A or aperture 46 as a means to rotatably secure center pull rotation member 40B to case 36; and a molded-in bump stop 64D to stop/secure hook 42 of center pull rotation member 40B a closed position. In FIG. 15A, the combination of the case 36 and a center pull rotation member 40B with aperture 46 or indentation/depression 46A form the alternative special compact and portable flip out/rotate out door pull 39 for sanitary use device 39. How it operates is described below in the operation section.

The materials anticipated for the various preferred and alternative door pull devices 30,31,32,33, 34, 35, 37, 38, 39, and 39P require durable and resilient materials that can tolerate hot water and steam washing as well as strong caustics for sanitizing the devices. These would be used for all the parts such as the cases 36, the extenders 40, 40A, 47 rotation member 40B, the pins 50, 51, 52, and the molded in bumps 53. They include plastics [such as urethane, polyurethane Polyethylene Terephthalate (PETE or PET or PETG), High-Density Polyethylene (HDPE), Polyvinyl Chloride (PVC), Low-Density Polyethylene (LDPE), Polypropylene (PP), Acrylonitrile butadiene styrene (ABS)] and an anti-microbial plastic such as Microban® or the like especially for the center pull blades 40A,40B; metals such as stainless steel, aluminum, polishable steel alloys, and composite materials. The materials used to hold the cases together include adhesives, glues, pins, rivets, and small threaded fasteners. Connecting processes include ultrasonic welding, friction welding, soldering, mechanical latches, and the like. The overall device including the materials and connection materials or processes is required to be dishwasher safe.

The details mentioned here are exemplary and not limiting. Other specific components and manners specific to describing a special compact and portable door pull for sanitary use 30 can be added as a person having ordinary skill in the field of the art of extendable and rotatable door pull devices and their uses well appreciates.

OPERATION OF THE PREFERRED AND ALTERNATIVE EMBODIMENTS

The special compact and portable door pull for sanitary use 30 has been described in the above embodiment. The manner of how the device operates is described below. One notes well that the description above and the operation described here must be taken together to fully illustrate the concept of the door pull device 30. A preferred special compact and portable extender/slide out door pull 30, 35 device for sanitary use comprising: (a) a single piece case 36, the case 36 comprising two case sides 60 each side with an interior and exterior surface and a molded-in retention bump 53 on the interior surface of each side to retain a center piece extension 40A, and the case further comprising a connecting and closed bottom section 70; (b) the center piece extension 40A having two external surfaces and comprising a closed slot/indentation 62A running length wise on each external surface, a thumb bump 45, and a hook feature 42 forming a partial perimeter around one half of a clearance area 41 wherein the case 36 surrounds the center piece extension 40A which can be extended outwardly from one end of the case 36 and can removably attach to a door handle 96 by a person 100 to enable the person 100 to sanitarily pull the door handle 96. An alternative special compact and portable flip-out/rotate-out door pull 30,39 for sanitary use comprising: (a) a single piece case 36, the case 36 comprising a rotation slot 63RS for internal clearance to allow for a rotation of a center door pull rotation member 40B, and the case 36 further comprising two case sides 60 each side with an interior and exterior surface and each side having a molded-in channel/trough 63 on the interior surface, each side having a molded-in retention bump 64C to engage an indentation 46A as a means to secure the center pull rotation member 40B to the case 36, and at least one case side on the interior having a molded-in bump stop 64D to releasably stop/secure a hook 42 of the center pull rotation member 40B in a closed position; (b) the door pull rotation member 40B comprising the rotatably/pivotally indentation 46A to engage the molded-in bump 64C of the case 36, a thumb bump 45A, and a hook feature 42 forming a partial perimeter around one half of a clearance area 41 wherein the center pull rotation member 40B is retained by the indentation 46A and the molded-in bump 64C of the case 36 and the center pull rotation member 40B placed between the interior of each case 36 side and wherein the case 36 encases the center pull rotation member 40B whereby the member 40B can be rotated and pivoted outwardly from one end of the case 36 and the hook 42 of the member 40B can be removably attached to a door handle 96 by a person 100 to enable the person 100 to sanitarily pull the door handle 96 and open a door without a hand 102 of the person 100 touching the door handle 96. For both of the compact and portable extender/slide out door pull 30,35 the compact and portable flip-out/rotate-out door pull 30,39, and their respective cases 36 are made of a durable, resilient, and dishwasher-safe material.

FIGS. 7A through 7C are sketches of a person 100 using the alternative slide out door pull device 32,37 for sanitary use. Provided in these sketches are: an extension prototype 37 of the slotted design 32 of the special compact and portable door pull for sanitary use 30; a door pull extension 40; a hook 42 of door pull extension 40; a thumb bump 45 of door pull extension 40; a guide and retention pin 51 for the slotted extension design 32 of the door pull 30; and a person 90 using a slotted extension design 32 of the compact and portable door pull for sanitary use 30; a handle 96 of restroom exit door; a person/operator 100 using a slotted extension design 32 of the compact and portable door pull for sanitary use 30; and, a hand 102 of the person 100.

FIGS. 11A and 11B are sketches of a rotating lever design 33,38 and of a person 100 using the rotating lever design 33,38 for the sanitary door pull device. Components demonstrated here are: a lever design prototype 38 of the pivot lever design 33 of the compact and portable door pull for sanitary use 30; an extension lever 47 for pivot design 38; an person 92 using a pivot lever design 33 of the compact and portable door pull for sanitary use 30; a handle 96 of restroom exit door; a person/operator 100 using a pivot lever design 33 of the compact and portable door pull for sanitary use 30; and, a hand 102 of the person 100.

FIGS. 12A through 12C are sketches of a person using the prototype 34 of the preferred special compact and portable extender/slide out door pull 35 device for sanitary use. Here the preferred special compact and portable extender/slide out door pull 35 device begins in a closed position in FIG. 12A, then it starts to extend in FIG. 12B, and finally it is fully extended in FIG. 12C, ready for use by the person 100. Shown here are the components and features: the prototype 34 of the preferred special compact and portable extender/slide out door pull 35 for sanitary use device; a case 36; center door pull extension 40A with indented closed slot 62A or retention channel 62 to guide retention fastener 64A or molded-in retention bump 53 for slide design 35 and prototype 34; a thumb bump 45 of door pull extension 40A; and a retention fastener 64A for slide design 35 and prototype 34.

FIGS. 13A through 13D are sketches of a person using the prototype 39P of the alternative special compact and portable flip out/rotate out door pull device 39 for sanitary use. In FIG. 13A the unit 39P is closed. It then starts to rotate for use in FIG. 13B. Next, it continues to rotate into position as shown in FIG. 13C. Finally, it is fully rotated and in its longest position and ready for use in FIG. 13D. The other components have been discussed in the above figures. Unique components demonstrated here include: center pull rotation member 40B with through hole/aperture 46 to accept retention fastener 64B for rotate out/flip out design 39 and prototype 39P; a thumb bump 45A of door pull rotation member 40B; and the retention fastener 64B for rotate out/flip out design 39 and prototype 39P.

The special compact and portable door pulls for sanitary use 30,35 operates as follows: (1.) The device 30, 35 is removed from a pocket, purse, belt loop or carrying bag by a person 100. (2.) The device is held in the hand 102 of the person 100. (3.) The person 100 pushes the thumb bump 45 and starts to push the extender 40A out of the case 36. (4.) When the hook 42 of the extender 40A is fully extended, the molded-in retention slot 63 stops at the retention pin 64A and the person 100 has a completely and fully extended device 30. (5.) The person 100 continues to exert pressure on the thumb bump 45 while reaching for the door handle 96. (6.) The person 100 engages the door handle 96 with the hook portion 42 of the extender 40A. (7.) The person 100 pulls the door open with the device 30 hooked and engaged with the handle 96. (8.) The person 100 can then fully open the door by holding the handle 96 with the device 30,35. (9.) The person 100 can then leave the restroom without having to touch the door handle thus lessening germ transmission. (10.) When exit is complete, the extender 40A is retracted with the thumb bump 45 and the extender 40A is now fully inside the case 36. (11.) The device 30 can be placed back into/onto the pocket, purse, belt loop, or carrying bag of the person 100. In a similar manner, the alternative special compact and portable flip out/rotate out door pull 30, 39 device is made ready by rotating the center rotation member 40B by using the thumb bump 45A of door pull rotation member 40B until fully rotated and ready for use; and further used as described above for the extending device 35.

With this description it is to be understood that the special compact and portable door pulls for sanitary use 30, 35,39 are not to be limited to only the disclosed embodiment of product. The features of the door pull device 30, 35, 39 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred and alternative methods and materials are now described above in the foregoing paragraphs.

Other embodiments of the invention are possible. Although the description above contains much specificity, these should not be construed as limiting the scope of the invention, but as merely providing illustrations of some of the presently preferred and alternative embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A compact and portable extender/slide outdoor pull [30,35] device for sanitary use comprising:
   (a) a single piece case [36], the case [36] comprising two case sides [60] each side with an interior and exterior surface and a molded-in retention bump [53] on the interior surface of each side to retain a center piece extension [40A], and the case further comprising a connecting and closed bottom section [70];

(b) the center piece extension [40A] having two external surfaces a closed slot/indentation [62A] running length wise on each external surface, a thumb bump [45], and a hook feature [42] forming a partial perimeter around one half of a clearance area [41]

wherein the case [36] surrounds the center piece extension [40A] which can be extended outwardly from one end of the case [36] and can removably attach to a door handle [96] by a person [100] to enable the person [100] to sanitarily pull the door handle [96].

2. The compact and portable extender/slide outdoor pull [30,35] of claim 1 further comprised of an aperture/slot [36A] for identification badge holder strap or key ring.

3. The compact and portable extender/slide outdoor pull [30,35] of claim 1 further comprised of a small battery powered flashlight [55], with LED.

4. The compact and portable extender/slide outdoor pull [30,35] of claim 1 further comprised of an aperture [56] for key ring and lanyard.

5. The compact and portable extender/slide outdoor pull [30,35] of claim 1 further comprised of a case, bag and/or sleeve [54] to contain and protect the compact and portable door pull [30,35].

6. The compact and portable extender/slide outdoor pull [30,35] of claim 1 wherein the center piece extension [40A] and the case [36] are made of a durable, resilient and dishwasher safe material.

7. The compact and portable extender/slide outdoor pull [30,35] of claim 6 wherein the durable, resilient, and dishwasher safe material is selected from a group consisting of plastic materials, metals, and composite materials.

8. The compact and portable extender/slide outdoor pull [30,35] of claim 7 wherein the plastic materials are selected from a group consisting of urethane, polyurethane, polyethylene terephthalate, high-density polyethylene, polyvinyl chloride, low-density polyurethane, polypropylene, acrylonitrile butadiene styrene, and anti-microbial plastic.

9. The compact and portable extender/slide outdoor pull [30,35] of claim 7 wherein the metals are selected from a group consisting of stainless steel, aluminum, and polishable steel alloys.

10. A compact and portable flip-out/ rotate-out door pull [30,39] comprising:

(a) a single piece case [36], the case [36] comprising a rotation slot [63RS] for internal clearance to allow for a rotation of a center door pull rotation member [40B], and the case [36] further comprising two case sides [60] each side with an interior and exterior surface and each side having a molded-in channel/trough [63] on the interior surface whereby each side has an interior and exterior surface and each side has an aperture/through hole [46] and whereby the case [36] is configured with a closed bottom section [70];

(b) a door pull rotation member [40B] comprising a rotatably/pivotally indentation [46A] to engage a molded-in bump [64C] of the case [36], a thumb bump [45A], and a hook feature [42] forming a partial perimeter around one half of a clearance area [41]; and (c) a retention fastener [64A] that extends through an aperture/through hole [46] through each side of the case [36], and an aperture [46B] in the door pull rotation member [40B] wherein the fastener [64A] extends through and is pressed snugly into the aperture [46] of the case [36] and loose through the aperture [46B] in the center piece [40B] so that the center piece [40B] can rotate and pivot in and out of slot [63] while being secured to the case [36].

11. The compact and portable flip-out/rotate-out door pull [30,39] of claim 10 further comprised of a spring switch [57] including a spring [58], a thumb latch [59], and a clip means [57A] to connect the spring switch [57] to the case [36].

12. The compact and portable flip-out/rotate-out door pull [30,39] of claim 10 further comprised of a case, bag and/or sleeve [54] to contain and protect special compact and portable flip-out/rotate-out door pull [30,39].

13. The compact and portable flip-out/rotate-out door pull [30,39] of claim 10 wherein the center door pull rotation member [40B] and the case [36] are made of a durable, resilient, and dishwasher-safe material.

14. The compact and portable flip-out/rotate-out door pull [30,39] of claim 13 wherein the durable, resilient, and dishwasher safe material is selected from a group consisting of plastic materials, metals, and composite materials.

15. The compact and portable flip-out/rotate-out door pull [30,39] of claim 14 wherein the plastic materials are selected from a group consisting of urethane, polyurethane, polyethylene terephthalate, high-density polyethylene, polyvinyl chloride, low-density polyethylene, polypropylene, acrylonitrile butadiene styrene, and anti-microbial plastic.

16. The compact and portable flip-out/rotate-out door pull [30,39] of claim 14 wherein the metals are selected from a group consisting of stainless steel, aluminum, and polishable steel alloys.

* * * * *